(12) United States Patent
Byle

(10) Patent No.: US 6,190,091 B1
(45) Date of Patent: Feb. 20, 2001

(54) TENSION CONTROL DEVICE FOR TENSILE ELEMENTS

(75) Inventor: Steven M. Byle, Houston, TX (US)

(73) Assignee: Novellent Technologies LLC, Houston, TX (US)

(*) Notice: Under 35 U.S.C. 154(b), the term of this patent shall be extended for 0 days.

(21) Appl. No.: 09/140,294

(22) Filed: Aug. 25, 1998

Related U.S. Application Data

(60) Provisional application No. 60/056,982, filed on Aug. 26, 1997.

(51) Int. Cl.[7] .................................................. B63B 21/20
(52) U.S. Cl. .................... 405/224.4; 405/212; 405/185.1
(58) Field of Search ................................ 405/195.1, 224, 405/224.4, 223.3; 166/350, 359, 367; 267/141.1

(56) References Cited

U.S. PATENT DOCUMENTS

| | | | |
|---|---|---|---|
| 3,999,497 | * 12/1976 | Hamel | 405/212 X |
| 4,043,545 | * 8/1977 | Dial et al. | 405/212 X |
| 4,200,268 | 4/1980 | Wiek | 267/63 R |
| 4,324,194 | * 4/1982 | Elliston | 405/195.1 X |
| 4,359,095 | 11/1982 | Goldsmith . | |
| 4,759,662 | * 7/1988 | Peppel | 405/224.4 |
| 4,808,035 | * 2/1989 | Stanton et al. | 405/224.4 |
| 4,892,444 | * 1/1990 | Moore | 405/224 X |
| 5,133,578 | * 7/1992 | Whightsil et al. | 405/195.1 X |
| 5,160,219 | 11/1992 | Arlt . | |
| 5,257,592 | 11/1993 | Schaefer | 114/215 |
| 5,363,920 | 11/1994 | Alexander et al. | 166/350 |
| 5,366,324 | 11/1994 | Arlt et al. . | |
| 5,467,833 | 11/1995 | Crain | 175/52 |
| 5,482,406 | * 1/1996 | Arlt | 405/195.1 |
| 5,873,678 | * 2/1999 | Moses | 405/224 X |

FOREIGN PATENT DOCUMENTS

| | | |
|---|---|---|
| 0 419 057 A1 | 3/1991 | (EP) . |
| 854 160 | 4/1940 | (FR) . |
| 2 037 812 | 12/1970 | (FR) . |
| 2 139 332 | 1/1973 | (FR) . |
| 2 360 797 | 3/1978 | (FR) . |
| 2 003 578 | 3/1979 | (GB) . |
| 2 066 191 | 7/1981 | (GB) . |
| 1 598 865 | 9/1981 | (GB) . |
| 2 136 530 | 9/1984 | (GB) . |
| 2 299 649 | 9/1996 | (GB) . |
| 2-34498 | 2/1990 | (JP) . |

OTHER PUBLICATIONS

Patent Abstracts of Japan, Mitsui Eng. & Shipbuild Co Ltd., Multi-Point Mooring Method for Floating Type Ocean Structure, Jul. 25, 1988, 1 page.

Klaas Dijkstra, "Systemes de tension pour plate-formes de forage," vol. 24, No. 8; Paris, France; pp. 12, 14, 16–18.

Energie Fluide, Systemes de tension pour plate-formes de forage, Nov. 24, 1985, pp. 12, 14, 16–18.

* cited by examiner

Primary Examiner—David Bagnell
Assistant Examiner—Frederick L. Lagman
(74) Attorney, Agent, or Firm—Rosenthal & Osha L.L.P.

(57) ABSTRACT

A tensile system for attachment between a first body and a second body having relative movement with respect to each other includes at least one tensile element attached to the first body and at least one collapsible energy cell coupled between the tensile element and the second body. The collapsible energy cell includes a buckling elastomer spring and has a normal state when the buckling elastomer spring is unbuckled and a collapsed state when the buckling elastomer spring buckles. The tension variations in the tensile element apply a compressive force to deflect the buckling elastomer spring.

45 Claims, 37 Drawing Sheets

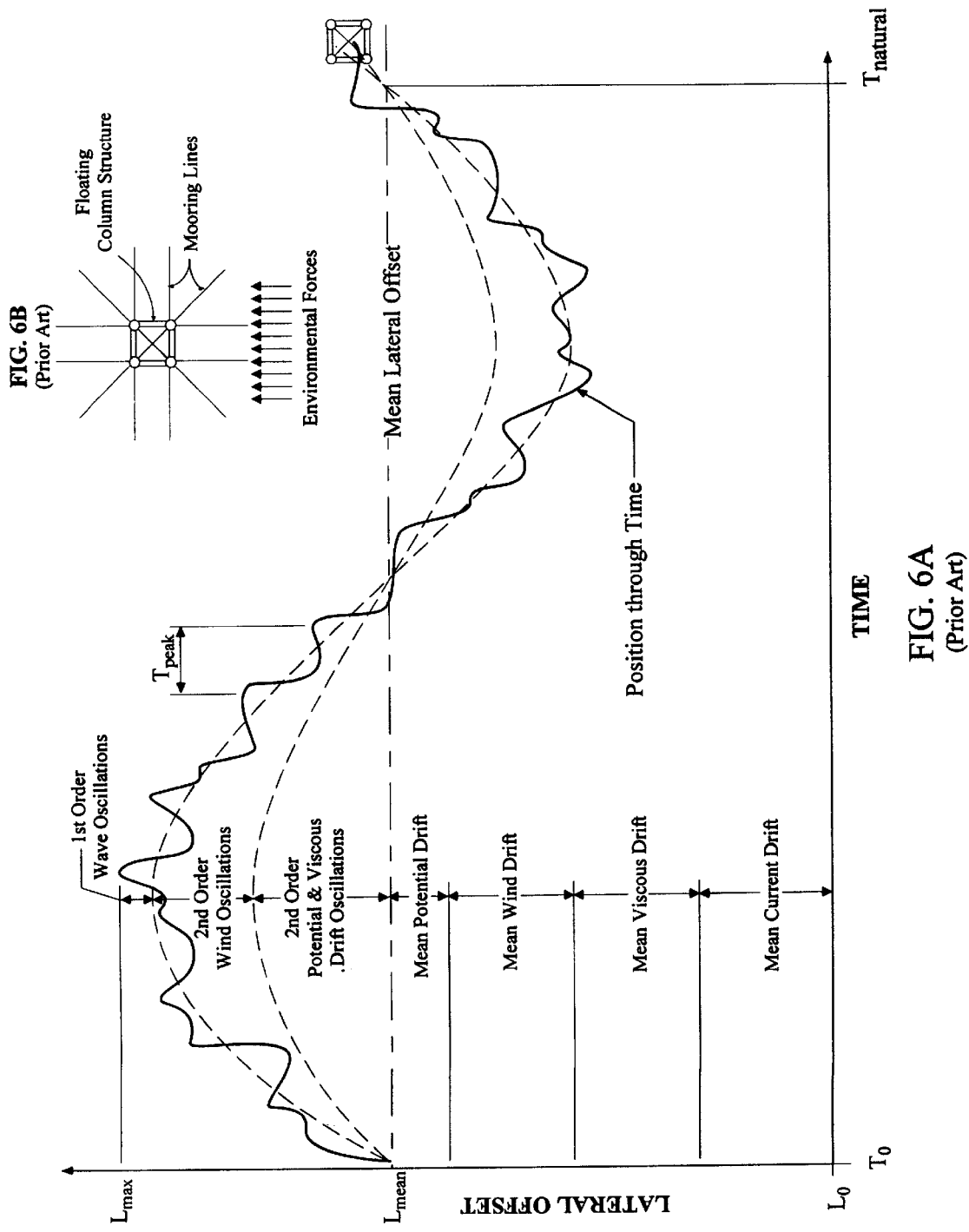

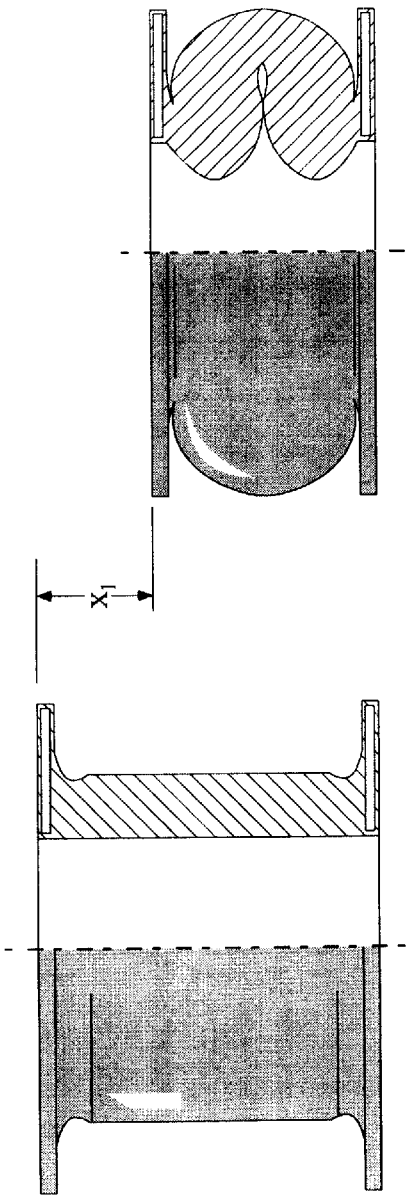
FIG. 8A (Prior Art)
FIG. 8B (Prior Art)
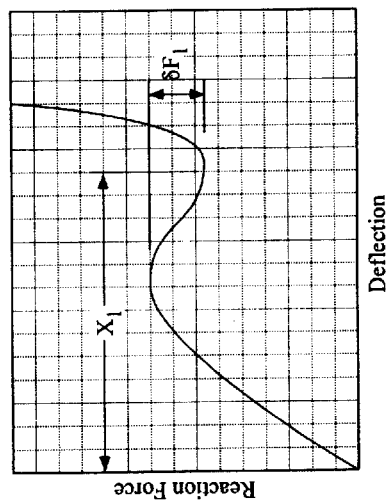
FIG. 8C (Prior Art)

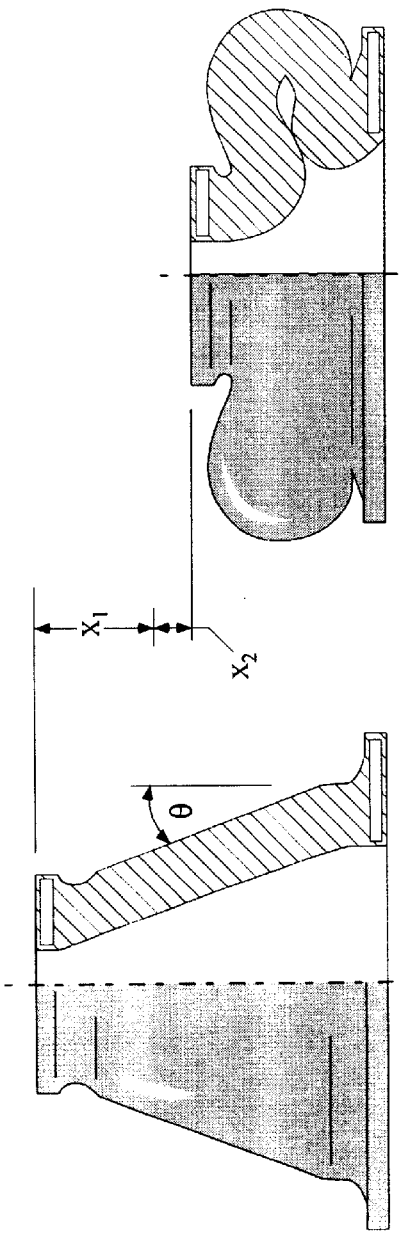
FIG. 8D
(Prior Art)
FIG. 8E
(Prior Art)
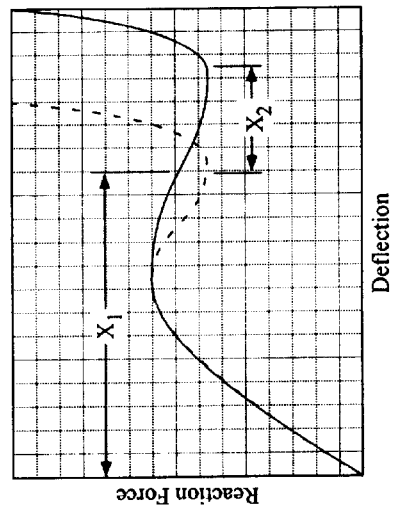
FIG. 8F
(Prior Art)

FIG. 10A
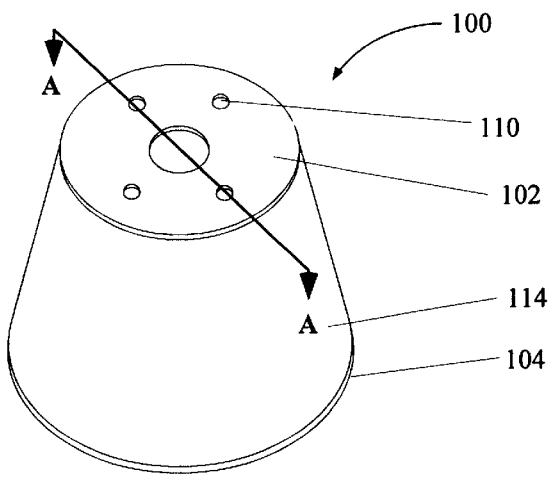
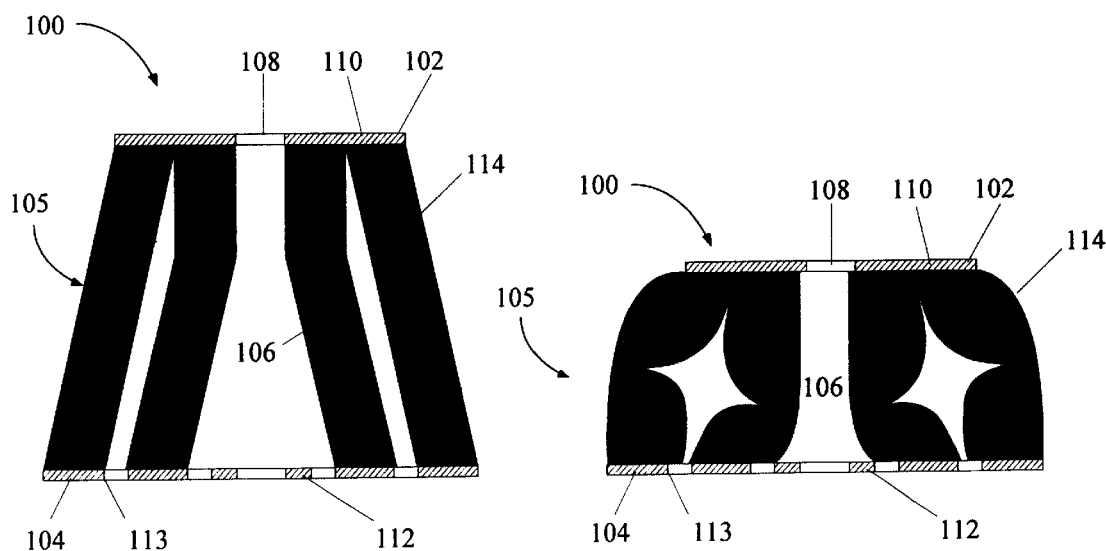
FIG. 10B          FIG. 10C

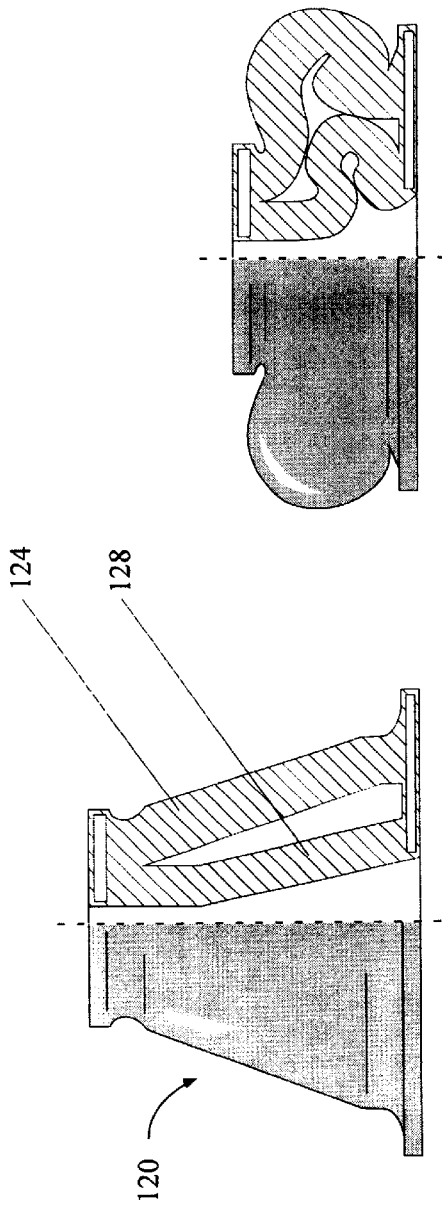
FIG. 11G (Prior Art)
FIG. 11H (Prior Art)
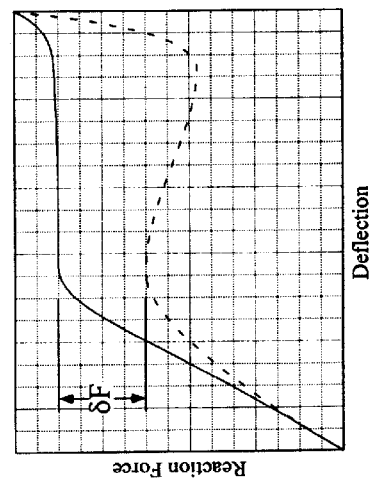
FIG. 11I (Prior Art)

A-A

B-B

C-C

D-D

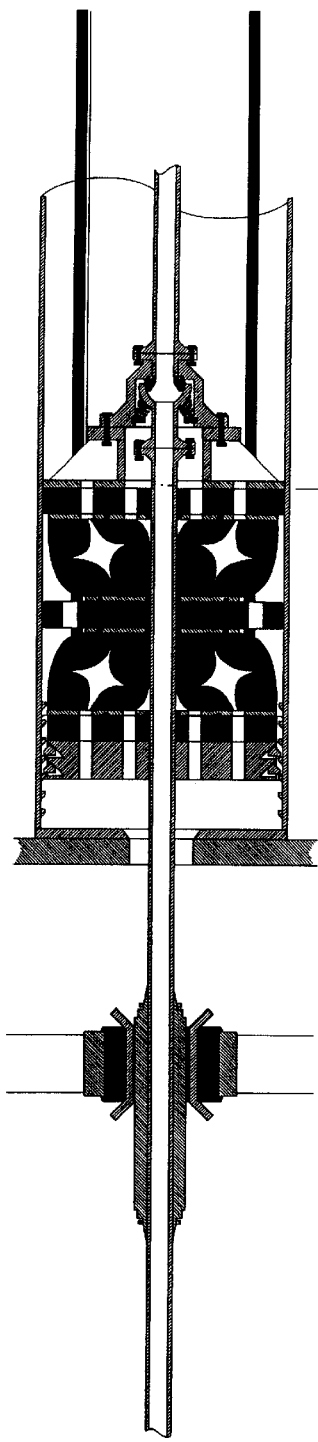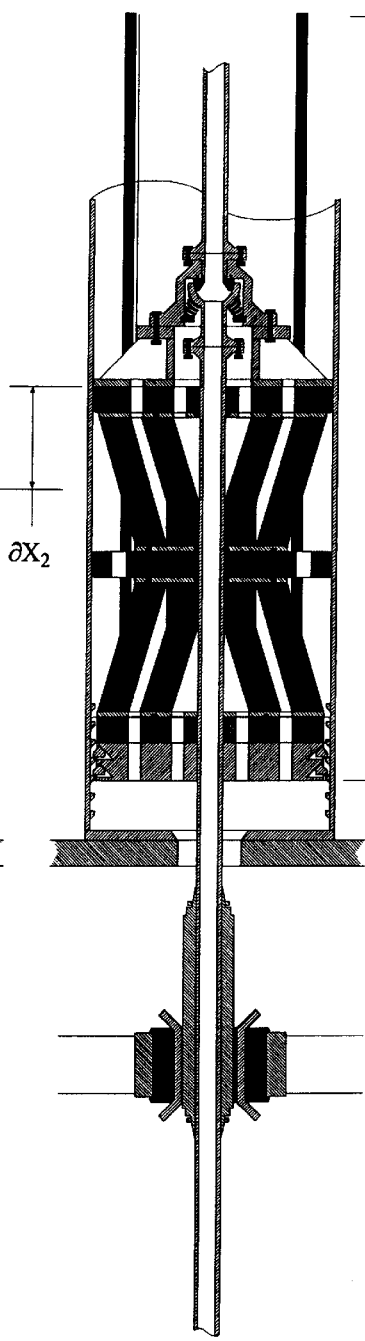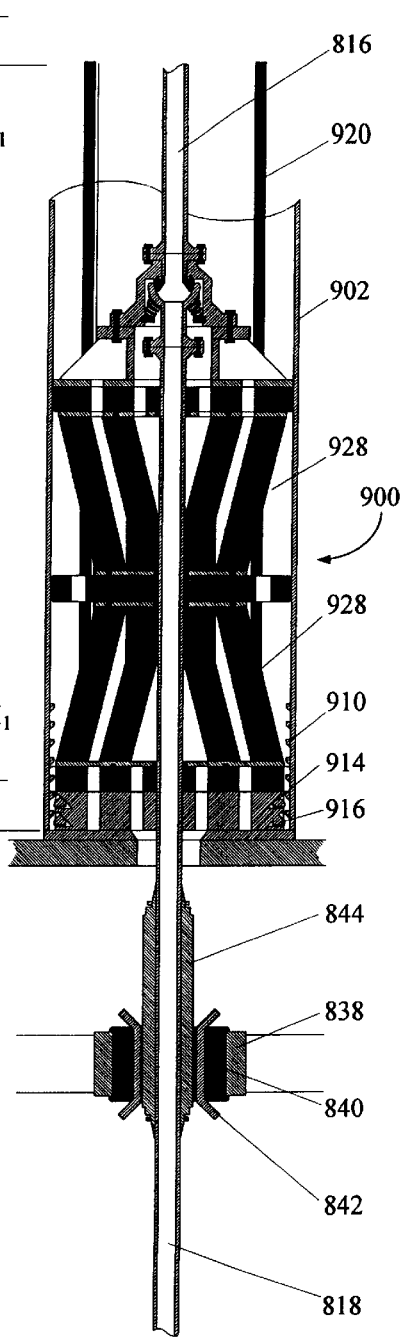
FIG. 23C
FIG. 23A
FIG. 23B

TENSION CONTROL DEVICE FOR TENSILE ELEMENTS

This appln. claims the benefit of U.S. Provisional No. 60/056,982 filed Aug. 26, 1997.

BACKGROUND OF THE INVENTION

1. Technical Field

The invention relates generally to floating structures used in conducting offshore petroleum operations, e.g., drilling, exploration, production, and storage. More specifically, the invention relates to an apparatus and method for controlling tension levels in tensile elements, e.g., mooring lines, marine tendons, and risers, which extend between a floating structure and the seafloor or other body.

2. Background Art

The oil industry is increasingly relying upon offshore oil deposits to meet the needs of the energy market. However, offshore operations, such as exploration, drilling, and production, are subject to a host of challenges that do not exist on dry land. These challenges become even more acute in deep water where floating structures, which are subject to irregular motions during operation, are employed. As illustrated in FIG. 1, a floating structure that is stationed in an open sea environment is subject to environmental forces of wind, waves, and current which may combine to induce the generally undesirable response of oscillatory motions along six degrees of freedom. Generally, displacements in the vertical, longitudinal, and transverse directions are referred to as heave, surge, and sway, respectively. Rotations about the heave, surge, and sway axes are generally referred to as yaw, roll, and pitch, respectively. For floating structures that are generally symmetric, the term lateral offset or surge may be used to refer to surge or sway motion of the floating structure and the term pitch may be used to refer to pitch or roll motion of the floating structure.

Frequently, it is desirable for a floating structure to remain relatively stationary either in relation to a fixed point on the seafloor or relative to another body. Holding a floating structure in position, or on station, and reducing lateral excursions about this station against the forces of the environment is referred to as station-keeping. Station-keeping is difficult in any offshore operation, especially when relatively rigid fluid-carrying pipes such as risers extend between the floating structure and the seafloor. In operations involving risers, stringent requirements are usually imposed on the station-keeping system to prevent damage to the risers. It is usually desirable to maintain tension in a riser to prevent the riser from buckling or collapsing under its own weight or under the action of the environmental forces. Thus, as the floating structure responds to the environmental forces, one of the challenges then becomes keeping the floating structure on station while providing appropriate tensile support to the riser. Various prior art structures have been developed to compensate for the motions of the floating structure while providing tensile support to risers. Deep water operations, however, have pushed the limits of traditional systems employed for riser tensioning and station-keeping. Nevertheless, the discovery of large, deep water oil deposits and the forces of economics continue to drive the industry into increasingly deeper water, thus making it desirable to have a station-keeping system and a riser tensioning system that is effective in even deep water.

Floating structures typically employ dynamic positioning systems or a system of tensile elements attached between the floating structure and the seafloor for station-keeping. Dynamic positioning systems use active means of monitoring position combined with thruster control to hold a fixed position. However, the use of dynamic positioning systems are generally limited to short term operations, such as drilling. For long term operations, floating structures generally employ tensile elements, such as mooring lines and marine tendons. Mooring lines are the most common tensile elements employed for station-keeping. Some floating structures use both mooring lines and marine tendons for station-keeping. Mooring lines are typically made of sections of chain, wire rope, synthetic rope, or a combination of such materials. In harbors, ropes are typically used to attach a floating structure to a dock or to hold station in open water. In open seas, catenary mooring lines are commonly used. Marine tendons are typically vertical, relatively rigid pipes that extend between the floating structure and the seafloor.

FIG. 2 illustrates a floating structure 10 which employs a catenary mooring system, e.g., catenary mooring line 12, for station-keeping. The catenary mooring line 12 has one end attached to the floating structure 10 and another end attached to an anchor 14 on the seafloor. Typically, the length of a catenary mooring line is significantly in excess of the depth of water in which the floating structure is moored so that the mooring line forms a characteristic sagging or catenary shape between the floating structure and the seafloor. The length of the mooring line often exceeds the water depth by a factor of three to five. The mooring line 12 connects to the floating structure 10 at a connection angle $\phi$, where $\phi$ is measured with respect to the vertical axis of the floating structure 10. The larger the connection angle $\phi$, the more effective is the mooring line 12 in restraining surge motions of the floating structure 10. However, the connection angle for a catenary mooring line is relatively low, typically less than forty-five degrees.

The connection angle $\phi$ of a catenary mooring line may be made larger by increasing the pre-tension in the mooring line or by adding buoys to the mooring line. The mooring line 18 indicates the new position of the mooring line 12 when pre-tension in the mooring line 12 is increased. The mooring line 22 indicates the new position of the mooring line 12 when buoys 20 are added to the mooring line 12. As shown, increasing the pre-tension in the mooring line 12 or adding buoys to the mooring line 12 shifts the mooring line 12 upward, thereby increasing the connection angle of the mooring line. However, as water depth increases, the connection angle of the catenary mooring line tends to diminish due to the increasing weight of the catenary mooring line, making the catenary mooring line less desirable in very deep water. The catenary mooring line may be replaced with a taut mooring line which has a much shorter length and weighs less than the catenary mooring line. FIG. 2 shows a taut mooring line 24 having one end connected to the floating structure 10 and another end connected to a pile 26 on the seafloor. The taut mooring line 24 is pre-tensioned to achieve a desired connection angle with the floating structure 10. The connection angle of the taut mooring line is generally larger than the connection angle $\phi$ of the catenary mooring line, allowing the taut mooring system to provide better station-keeping characteristics. A taut mooring system, however, requires substantially higher pre-tensioning than a catenary mooring system.

In both taut and catenary mooring systems, the weight of the mooring line and the geometry of the mooring system configuration combine to give a generally non-linear relationship between tensions in the mooring line and lateral offsets of the floating structure. FIG. 3 shows an example of a mooring line tension versus lateral offset curve. As shown, mooring line tension increases gradually through an initial range of lateral offsets, but beyond the initial range of lateral offsets, mooring line tension increases exponentially. As a result of this non-linear behavior, relatively small lateral offsets result in large tension variations in the mooring line in the region where mooring line tension increases exponentially. For example, a lateral offset $\partial X_{0-1}$ for a mooring line with a pre-tension To induces a tension variation $\partial T_{0-1}$. Often, it is desirable to have a highly pre-tensioned mooring line, since this will enhance the restoring response of the mooring system. This is especially true for a taut mooring system. However, a much higher pre-tension induces a much higher tension variation in the mooring line. For example, for a mooring line with a higher pre-tension $T_2$, a lateral offset $\partial X_{2-3}$ induces a tension variation of $\partial T_{2-3}$. As shown, $\partial T_{2-3}$ is much larger than $\partial T_{0-1}$, even though the lateral offsets $\partial X_{2-3}$ and $\partial X_{0-1}$ are equal in magnitude.

Large cyclic tension variation, also known as loading cycle, during lateral oscillations of the floating structure result in increased fatigue in the mooring line and the possibility of the tension in the mooring line exceeding the breaking strength of the mooring line. Although, mooring line fatigue may also result from the forces of the waves and current inducing transverse mooring line vibrations, due to a phenomenon known as vortex shedding, the primary fatigue mode in a mooring line is due to cyclic axial tension. Thus, in designing a mooring line, several factors come into play, including design line tension, the magnitude of variations in axial tension in the mooring line during a loading cycle, and the number of loading cycles that the mooring line endures. Design line tension is the maximum expected tension that the mooring line must be able to endure without failure. For short term operations, the mooring line is usually selected such that the breaking strength of the mooring line is greater than or equal to the sum of the maximum expected tension and a factor of safety. However, over time, fatigue generally reduces the breaking strength of the mooring line. Therefore, for long term operations, the mooring line is usually selected such that the breaking strength of the mooring line is greater than or equal to the sum of the maximum expected tension, a factor of safety, and an additional factor accounting for the expected fatigue reduction in breaking strength.

Mooring lines are under constantly varying axial tension throughout their service life. Generally speaking, the smaller the magnitude of tension variations and the fewer the loading cycles, the less fatigue in the mooring line. Less fatigue allows longer service life for a mooring line with a given design line tension, or where there is a fixed service life, less fatigue allows the use of a mooring line with a smaller cross-sectional area, resulting in generally cheaper cost per unit length for the same design line tension. As water depth increases, the pre-tension required to maintain acceptable station-keeping characteristics generally increases. An increase in pre-tension generally leads to a higher maximum expected mooring line tension and higher cyclic tension variations with a commensurate increase in mooring line fatigue. The typical approach to overcoming this increased fatigue and higher maximum expected tension in the mooring line has been to increase the cross-sectional area of the mooring line. For deep water operations, this practice has led to very large and heavy mooring lines. The increase in size and weight of the mooring lines not only increases the cost of the mooring lines themselves, but also increases the cost of the mooring line handling equipment, adds expensive deck payloads, and requires the floating structure to have larger storage facilities. For example, under the current state of art, in water depths approaching four thousand feet, the diameter of a spiral metal strand mooring line may exceed six inches. The entire cost of the mooring line may constitute as much as thirty percent of the total cost of a typical drilling structure. Therefore, it would be highly desirable and economical to have a mooring system with highly pre-tensioned mooring lines but relatively low maximum line tensions and relatively small cyclic tension variations.

FIG. 4 illustrates a floating structure 30 employing a marine tendon system for station-keeping. The floating structure comprises a deck 32 that is positioned on a buoyant column 34 and pontoon structure 36. The marine tendon system includes a symmetric pattern of vertical pipes or tendons 38 hung from the floating structure 30 and rigidly connected to a tendon template 40 on the seafloor 44. The tendons 38 are pre-tensioned when the floating structure 30 is submerged to a distance $\partial Z$ below its free floating position and the columns 34 and pontoon structure 36 are deballasted. The tendons 38 function as rigid connections between the floating structure 30 and the seafloor 34 in the heave direction. The tendons 38 respond to heave motions of the floating structure 30 by elastically deforming along their axial axes. This tensile elastic deformation of the tendons provides a generally linear tendon tension versus heave displacement curve, with tendon tension linearly increasing with increasing heave displacement. Lateral offsets of the floating structure also induces elongation of the tendon, and a portion of the tension in the tendon, equal to the sine of the angle of the tendon with respect to the vertical, acts to provide a restoring force in the lateral direction. The shape of the tendon restoring force versus lateral offset is similar in shape to that of the mooring line tension versus lateral offset.

The applicability of a marine tendon system has primarily been limited to heave restrained vessels specifically designed to employ marine tendons. This is in part due to the complexity of marine tendon systems and the cost of installing marine tendons and tendon templates on the seafloor. The availability of highly pre-tensioned vertical tensile elements may, however, be a desirable component of the station-keeping of many floating structures for which marine tendons cannot currently be utilized. As with the design of a mooring line, the design of marine tendon systems is generally controlled by axial fatigue considerations. However, a marine tendon is basically a vertical rigid body exposed to wave and current forces near the water surface. Such forces may induce large transverse vibrations which may add additional complexity to fatigue design for marine tendons. Nonetheless, the ability to limit the maximum expected tension and magnitude of cyclic tension variations in a marine tendon would be an equally desirable feature for a marine tendon system.

Floating structures employing tensile elements for station-keeping may still encounter relatively large mean displacements and oscillations off the desired station. Heave motions of floating structures can be greatly reduced by employing marine tendon systems, but there is a substantial cost to using marine tendons and marine tendons are generally applicable to only a narrow class of specially designed vessels. It is often more economical and practical to design the hull of the floating structure to minimize heave motions. On the other hand, surge motions may be quite large under design environmental conditions, even when mooring or marine tendon systems are employed. Generally, these large surge motions occur because large amplitude second order motions for the floating structures result from resonant responses near the natural period of motion. Systems responding in resonance are critically dependent upon damping to reduce the amplitude of these motions. The hulls of floating structures, however, generally provide only a small amount of damping to the slow second-order motions. Further, the prior art tensile element station keeping systems employed also generally provide little additional damping to the floating system.

To better understand the response of a floating structure to environmental forces, a floating structure may be modeled as a spring mass system having a natural period of vibration described by the following expression:

$$T_n = 2\pi\sqrt{M/K}$$

where $T_n$ is the natural period of the mooring system, M is the mass of the system including added mass, and K is the stiffness of the system.

The vertical stiffness, K, in the heave direction is generally determined by the waterplane area of the submerged hull and the vertical stiffness characteristics of tensile elements, such as mooring lines and marine tendons, attached between the floating structure and another body. The horizontal stiffness, K, in the surge direction is generally determined by the horizontal stiffness characteristics of the attached tensile elements. In general, mooring lines make negligible contribution to vertical stiffness, and marine tendons make negligible contributions to horizontal stiffness. Therefore, for a moored floating structure, the stiffness in the heave direction is generally determined by the waterplane area, unless marine tendons are also employed. In the surge direction, the stiffness is generally determined by the horizontal stiffness characteristics of any attached mooring lines, independent of the use of marine tendons.

The stiffness characteristic, K, of a particular system of tensile elements is influenced by a number of factors. One important factor is the angle at which the tensile element connects to the floating structure. Generally, the closer a connection angle of a tensile element is to parallel with a particular direction of displacement, the larger the portion of tension in the tensile element that will act to reduce movement in that direction, thereby increasing stiffness, K, in that direction. Another important factor is the amount of pre-tension applied to the tensile element. For tensile elements having non-linear tension versus displacement curves, such as is typical in mooring lines, as pre-tension increases, the change in tension for a given displacement in a particular direction of displacement increases, resulting in an increase in the stiffness, K, in that direction.

The mass, M, of a floating structure is typically extremely large in comparison to the stiffness characteristics, K, of the attached tensile elements. Such a system may be referred to as an inertially controlled system. As described above, marine tendons are employed directly parallel to the direction of heave motion. Mooring lines, however, have connection angles much less than the ninety degrees required to come parallel to the direction of surge motions. The connection angles of mooring lines are typically near or below forty-five degrees. The connection angle where tendons are employed to reduce surge motions is much lower still, typically less than five degrees at the maximum expected lateral offset. Therefore, as a general rule, the vertical stiffness characteristic of the system is significantly higher than the horizontal stiffness characteristic. Vertical stiffness is also augmented by the restoring force provided by the change in buoyancy of the hull as the floating structure heaves. Thus, one can see, by reference to the expression above, that for a floating structure, the natural period, $T_n$, in the heave direction is generally much shorter than the natural period, $T_n$, in the surge direction. By way of example, a typical floating structure employing marine tendons, e.g., Tension Leg platform, may have a heave natural period of three to five seconds while a floating structure not employing marine tendons, e.g., SPAR platform or semi-submersible, may have a heave natural period of twenty-five to thirty seconds. The surge natural period of a typical floating structure, however, may be on the order of one hundred to three hundred seconds.

When a floating structure is stationed in an open sea environment, the floating structure is exposed to the forces of wind, current, and waves. Wind and current may be generally steady for time scales on the order of the natural period of an offshore structure, thereby generally inducing a non-oscillating, or mean, offset. However, wave patterns are generally irregular on these time scales and generally induce an offset having both a mean portion and an oscillating portion. An irregular wave surface is characterized by the presence of a large number of individual waves with different wave periods and wave heights. The statistical properties of such a surface may be described by means of a wave energy spectrum or wave energy distribution such as illustrated in FIG. 5A. The motion response of the floating structure may be characterized by means of a Response Amplitude Operator (RAO) such as illustrated in FIG. 5B.

The expected motion response of the floating structure may be derived from the product of the wave energy spectrum and the square of the Response Amplitude Operator, as illustrated in FIG. 5C. For example, the primary wave period for a one hundred year hurricane condition in the Gulf of Mexico is between fourteen and sixteen seconds. This environmental condition is often used as a design condition environment for floating structures employed in the Gulf of Mexico. The surge natural period of a typical moored floating structure employed in the Gulf of Mexico for production operations is on the order of one hundred to three hundred seconds. As can be appreciated by reference to FIGS. 5A to 5C, the surge motion response spectrum may be a double peaked curve. The first peak, which represents the first order motions occurring near the primary wave period, may be significantly smaller than the second peak, which represents the second order motions occurring near the surge natural period of the floating structure. A relatively small input of wave energy, generally corresponding to a relatively small magnitude of environmental forces, may induce large resonant response surge motions.

As illustrated in FIG. 6, the expected motion response of a floating structure in real-time may be broken down into three constituent components: a steady state offset, first order oscillations near the primary wave period, $T_{peak}$, and second order oscillations near the natural period, $T_{natural}$, of the floating structure. Steady state motions are induced by mean portions of the environmental forces, e.g., mean potential drift, mean wind drift, mean viscous drift, and mean current drift. In the surge direction, these environmental forces combine to induce a mean lateral offset, $L_{mean}$, called the static offset. Second order motions, called second order oscillations, occur as slow oscillations about the mean lateral offset, $L_{mean}$. First order motions, called first order oscillations, occur as superimposed oscillations over the second order oscillations to trace out the actual position of the floating structure through time. As illustrated in FIG. 6, all environmental forces are assumed to be applied in phase and in the same direction, thereby resulting in a maximum expected lateral offset, $L_{mean}$. This maximum expected lateral offset, $L_{max}$, generally represents the extreme condition used for tensile element design. Often an absolute limit is placed on the maximum expected lateral offset, $L_{max}$, to prevent damage to the risers. Large lateral offsets also add challenges to riser tensioning systems just as with large heave motions. It is, therefore, desirable to minimize the maximum lateral offset.

The primary function of a mooring or marine tendon system is to reduce mean portions of the motions of a floating structure. The magnitude of the mean portions of the motions may generally be reduced by increasing the pretension in the tensile elements used in a station-keeping system, i.e., by increasing the system stiffness. Generally, however, a mooring or marine tendon system has little effect in reducing dynamic motions due to the huge inertial force of the floating structure. Despite an increase in the pretension in the tensile element, the magnitude of the dynamic oscillations may not be significantly reduced. Little attention is generally paid to the first order motions because they are generally small relative to the mean offset and second order motions. As described above, the second order lateral oscillations of floating structures, however, are resonant motion responses and may be very large for a small input of environmental forces. The response amplitude of a resonant system is critically dependent upon the damping of the system, rather than the system stiffness, but the system damping characteristic for the second order motions is generally low for floating structures. This characteristic is due to the very slow velocity at which second order motions occur because of the large lateral natural periods. Wave damping acts to reduce shorter period motions by opposing rapid changes in velocity, such as heave motions and first order surge motions, but wave damping has little effect on the slow second order surge oscillations involving slow changes in velocity. Damping to reduce these second order resonant motions must be provided from other sources, such as the tensile element systems. Generally, increased damping results in lower amplitude resonant motion response. It is, therefore, generally desirable to have highly damped station keeping system to reduce surge motions of floating structures.

Now returning back to riser tensioning systems, an effective riser tensioning system should be able to maintain tension throughout the entire length of the riser to avoid any compressive loads in the riser. This is because risers are typically not designed to withstand compressive loads and such loads would generally result in buckling of the riser. Conventionally, the tensile force applied to a riser is between 1.2 and 1.8 times the riser load. The lower limit is generally set by the requirement to provide sufficient vertical force to keep the length of the riser in steady tension. The lower limit of the tensile force may also be affected by fatigue concerns due to transverse vibrations induced by the action of current and waves. As a general rule, the higher the tensile force applied, the smaller the amplitude of transverse riser pipe vibration from current and waves. The practical upper limit for the tensile force applied to the riser is determined by the tensile capacity of the riser. However, traditionally, it has been cost prohibitive to employ riser tensioning systems capable of employing the full tensile capacity of the risers.

An effective riser tensioning system should also be able to apply constant tensile force to the riser through a large of relative displacements between the top of the riser and the vessel. A certain limited range of variation in tensile loading may be acceptable to provide the desired service life of the riser. However, varying tensile forces induce fluctuations in the tensile stress levels in the riser. Even though the tensile force levels may be low, it is the variable application of these loads which shorten the life span of the riser through fatigue. The task of providing constant tension for risers, especially through a large range of relative displacement between the top of the riser and the vessel, has presented a significant obstacle to deep water operations.

Riser tensioning systems may be active, passive, or a combination of both. Active systems using pneumatic, hydraulic, cable, and sheave systems to support the weight of the riser are widely used. However, active systems require a substantially continuous input of energy and monitoring. Further, a battery of auxiliary equipment is required to supply fluids necessary for operations. Still further, active systems are subject to chronic maintenance and failure, requiring redundancy in the system to permit down time of an individual unit for replacement or repair. Passive systems on the other hand require little or no external input to function and virtually no monitoring. Accordingly, it would be desirable to provide a passive riser tensioning system. Further, a desirable riser tensioning system would be substantially maintenance free and would not have expected failures during the design service life.

There are various prior art passive tensioning systems. One prior art passive system supports a portion or all of the weight of the riser through use of buoyancy elements, e.g., buoyancy tanks filled with syntactic foam modules or buoyancy cans filled with ballast elements, attached to the riser below the water surface. The buoyancy cans may be attached to the riser near the water surface and deballasted by injecting high pressure air into the ballast elements. However, buoyancy cans may induce interference problems between the various risers, and so must be shielded from wave, current, and other forces which might cause movement of the cans. Buoyancy tanks filled with syntactic foam modules may be attached to the risers deep beneath the water surface, where wave and current forces are less pronounced. However, because the space around the riser is often limited, the buoyancy tank may not be large enough to support all of the weight of the riser.

U.S. Pat. No. 5,366,324 to Edward Arlt discloses a passive system that uses linear deformation of springs to maintain tension in the riser. Because the reaction force of the springs increase linearly as the springs deform elastically, a mechanical lever system is typically provided to compensate for the increasing reaction force. The mechanical lever system deflects the springs to apply force to the riser at a diminishing angle as the reaction forces of the springs increase. Through a limited range of elastic deflection of the springs, the apparent angle of the roughly linearly increasing reaction force versus deflection curve is reduced in a direction parallel to the riser. This provides a lower magnitude of cyclic tension variations in the riser for a given displacement as compared to applying the force of the springs in a direction parallel to the length of the riser.

U.S. Pat. No. 5,160,219 to Edward Arlt discloses another spring-based passive system that employs a combination of variable spring rates and geometry to reduce the apparent reaction force versus deflection curve toward the goal of providing constant tension over a range of displacement. The geometry employed may be similar to that of the previously described spring-based system. This system, however, employs springs which are a combination of elastomers of various modulus of elasticity. The springs may comprise concentric portions of various elastomers bonded one inside another to form a cone-like shape. Through initial displacements, the elastomer portion having the lowest modulus of elasticity deflects linearly to an angle wherein a portion having a higher modulus of elasticity begins to deflect. This spring design further reduces the apparent reaction force versus deflection curve in a direction parallel to the riser.

These spring-based systems depend upon the linear deformation of elastomeric materials. They generally employ relatively complex mechanical apparatus, and have heretofore provided only a limited range of relative displacement and service life for the riser.

U.S. Pat. No. 4,359,095 to Riley Goldsmith discloses another passive system that uses non-linear deformation of buckling elastomer columns to maintain tension in a riser. Buckling elastomer columns are, however, subject to creep, hysteresis, lateral or rotational instability, and reaction force drop-off through the buckled range of deflection. Further, a single buckling elastomer column can provide only a limited range of deflection and magnitude of riser tension. However, the spring rate of a column in the buckled range of deflection can provide a much softer reaction force versus deflection curve, eliminating the need for a complex mechanical apparatus to limit reaction force as in the previously described spring-based systems.

A classic mechanical engineering problem involves the prediction of column buckling. Referring to FIG. 7, when a slender body, such as a column, comprised of an elastic material, is compressed axially ($F_0$ to $F_1$) it will deflect elastically through an initial range of deflections ($\partial X_1$), essentially reducing in length. The slope of this curve in the elastic deflection range is often almost linear ($\partial X/dF$). At some critical point ($X_{critical}$), however, the column will buckle outward and deform non-linearly. The column will then generally deflect through some range of buckled deflection ($\partial X_2$) before snubbing occurs ($\partial X_3$). As shown, the reaction force versus deflection characteristics differ substantially between the linear range of deflection ($\partial X_1$) and the buckled ($\partial X_2$) range of deflection. Many reaction force versus deflection characteristics may be designed by varying aspects such as the material properties of the column, the cross-sectional shape along the column's length, or the geometric arrangement of multiple columns. The typical curve has a decreasing reaction force past initial buckling ($\partial X_2$), before the force again begins to increase just prior to material failure ($\partial X_3$) as snubbing occurs. The shape of the curve in the buckled range is, however, subject to manipulation. Curves having a constant, slowly increasing, and slowly decreasing reaction force over a range of deflection are all possible.

In general, however, industry has found few uses for this buckled deflection characteristic of elastic materials. This may be primarily due to the fact that buckled deflection is non-recoverable in most elastic materials, such as metals. As shown in FIG. 7, a permanent, or non-recoverable, deflection ($\partial X_p$) will remain after unloading the column. This makes the buckled deflection either a non-repeatable process, or one that may be repeated only a limited number of times. There are classes of materials, however, that have the property of high resistance to the shear strain generally involved with buckled deflection. The full range of buckled deflection may be recoverable and repeatable for these materials. Such buckling elastic materials, or elastomers, will repeatedly return to the unbuckled and undeflected condition upon removal of the compressive force. Generally, these materials are synthetic polymers, but there are also naturally occurring buckling elastomers.

One naturally occurring elastomer is rubber. Synthetic rubber, however, is more frequently used by industry. Both natural and synthetic rubber have the property of being extremely durable against repetitive loading or fatigue, as well as being wear and corrosion resistant. Rubber also has excellent properties for resisting both compressive loads and shear loads. Further, rubber has a specific gravity of near that of seawater, making rubber roughly neutral buoyant in seawater. The offshore industry makes use of rubber products for many purposes, such as for barge bumpers, boat landings, fenders, riser guards, shock absorbers, and many other applications. The applications of rubber in the offshore industry have generally been for protection devices, utilizing the energy absorbing properties of rubber to absorb the energy of dynamic and impact loads as heavy floating objects collide. Some of these applications employ rubber configurations that take advantage of the shear resistant properties of rubber and the buckled deflection of elastomer columns.

One example is the dock fender. Dock fenders are employed to absorb the large kinetic energy of ships when they strike up against the dock sides during docking. The fenders are designed to absorb a large quantity of kinetic energy for a given deflection. An exemplary buckling elastomer column unit employed in a dock fender is illustrated in FIG. 8A. The configuration shown is typically referred to as a cell fender. As shown in the reaction force versus deflection curve, the elastomer unit of the cell fender has a steep curve through the initial linear portion curve to quickly provide a high force to oppose a heavy barge. At a critical point the fender buckles, and the reaction force curve begins to dip slowly an amount ($\partial F_1$). This characteristic is employed to provide a large area under the curve, representing the energy absorbed by the dock fender, for a given fender deflection ($X_1$). The larger the area under the curve, the greater the ship impact that may occur without damage to ship or dock.

As illustrated in FIG. 8B, the quantity of energy absorbed can be increased for a given maximum force by extending the length of buckled deflection an amount ($X_2$). One manner in which this can be achieved is by employing a configuration of elastomer columns at some angle ($\phi$) off vertical, in a cone shape rather than the tubular configuration of a cell fender. As illustrated in FIG. 8C, the amount of energy absorbed can further be increased by reducing the reaction force drop-off ($\partial F_2$) through the buckled range of deflection. One known manner in which this can be achieved is by adjusting the cross-section of the elastomer column, such as by increasing the thickness of the column (T) in the appropriate place.

FIG. 9 illustrates one possible reaction force versus deflection curve that may be designed by a structured configuration of buckling elastomers, referred to as an elastomer spring. As can be appreciated by reference to FIG. 9, when the elastomer spring is initially subjected to compressive loading, the spring provides a roughly linearly increasing reaction force versus deformation curve ($\partial X_0/\partial T_0$). However, when loading reaches a critical force ($T_1$), the walls of the spring configuration buckle. Through a range of deformation following first buckling ($\partial X_1$), the buckling elastomer spring deforms non-linearly and may be designed to provide a substantially constant reaction force. This type of non-linear deformation is structural and recoverable, unlike the previously described non-recoverable variety, incident to materials such as metals and other less strain-resistant materials. As such, this type of non-linear deformation can be repeated. At the end of this range of non-linear deformation, the non-linear range is exceeded and the reaction again begins to increase with increasing deformation until failure results.

Several difficulties arise in employing elastomers for repetitive loading over a long duration. One problem can be the hysteresis characteristic of the reaction force versus deflection curve. As illustrated in FIG. 9, a buckling elastomer spring generally traces a different path on the reaction force versus deflection curve during the loading phase than it does during the unloading phase. The curve follows a path of lower reaction force during unloading. As described above, this result is due to the fact that the rubber absorbs a certain amount of energy during each cycle of loading and unloading. In a purely elastic deflection, a spring will trace the same path along the curve, essentially conserving the mechanical energy. In the case of a buckling elastomer spring, however, non-linear deformations of the elastomer are subject to a drop in reaction force when the unloading phase begins. The path traces back along a different line throughout the non-linear and linear ranges. The path traced is generally dependent upon the velocity and amplitude of deflection. However, the buckling elastomer spring will return to the original undeformed configuration at the end of the unloading cycle. In both instances, the area within the loop made by tracing the loading and unloading path, referred to as a hysteresis loop, is a measure of the quantity of heat energy absorbed during the loading and unloading cycle. The spring will heat up unless the energy can be radiated away from the spring. Elastomers such as natural rubber may be particularly subject to overheating. The shape of the reaction force versus deflection curve for a buckling elastomer spring may begin to degrade at temperatures as low as one hundred eighty degrees.

SUMMARY OF THE INVENTION

In general, in one aspect, a tensile system for attachment between a first body and a second body having relative movement with respect to each other comprises at least one tensile element attached to the first body and at least one first collapsible energy cell coupled between the tensile element and the second body. The first collapsible energy cell comprises a first buckling elastomer spring and has a normal state when the first buckling elastomer spring is unbuckled and a collapsed state when the first buckling elastomer spring buckles. Tension variations in the tensile element apply a compressive force to deflect the first buckling elastomer spring.

In another aspect, a method of limiting tension in a tensile element attached between a first body and a second body comprises selecting a maximum tension and a maximum range of tension variations for the tensile element, predicting a range of displacements between the first body and the second body, and selecting at least one collapsible energy cells having at least one buckling elastomer spring configured to buckle and deflect non-linearly through the predicted range of displacements while limiting the tension in the tensile element to the maximum tension and the range of tension variations to the maximum range of tension variations. The method further comprises attaching the tensile element to the first body and coupling the tensile element to the second body through the collapsible energy cell.

In yet another aspect, a tensile system for attachment between a floating body and a stationary body comprises at least one riser extending between the floating body and the stationary body. The riser has an end coupled to the stationary body. A support base coupled to the floating body braces the riser. A first riser tensioner has a first end coupled to the riser and a second end coupled to the support base. The riser tensioner comprises a plurality of collapsible energy cells stacked in series. Each collapsible energy cell comprises a first buckling elastomer spring and has a normal state when the first buckling elastomer spring is unbuckled and a collapsed state when the first buckling elastomer spring buckles. Movement of the support base relative to the riser induces a compressive force to deflect the first buckling elastomer springs, the first buckling elastomer springs maintaining tension in the riser substantially constant through a range of deflection.

Other advantages will become apparent from the following description and from the appended claims.

BRIEF DESCRIPTION OF THE DRAWINGS

FIG. 6A illustrates a generalization of a time domain response of a floating structure in an irregular sea.

FIGS. 8A—8I illustrate various configurations of prior art buckling column springs in relaxed and compressed states with accompanying reaction force versus deflection curves.

FIGS. 10A—10C illustrate perspective and cross-sectional views of an energy cell.

FIGS. 11A—11I illustrate various configurations of buckling column elastomer springs in relaxed and compressed states with accompanying reaction force versus deflection curves.

FIGS. 23A–23C are cross-sectional side views of the buckling elastomer riser tensioner of FIG. 22 in a non-tensioned, pre-tensioned, and maximum deformation condition.

DESCRIPTION OF THE PREFERRED EMBODIMENTS

Figure 1:
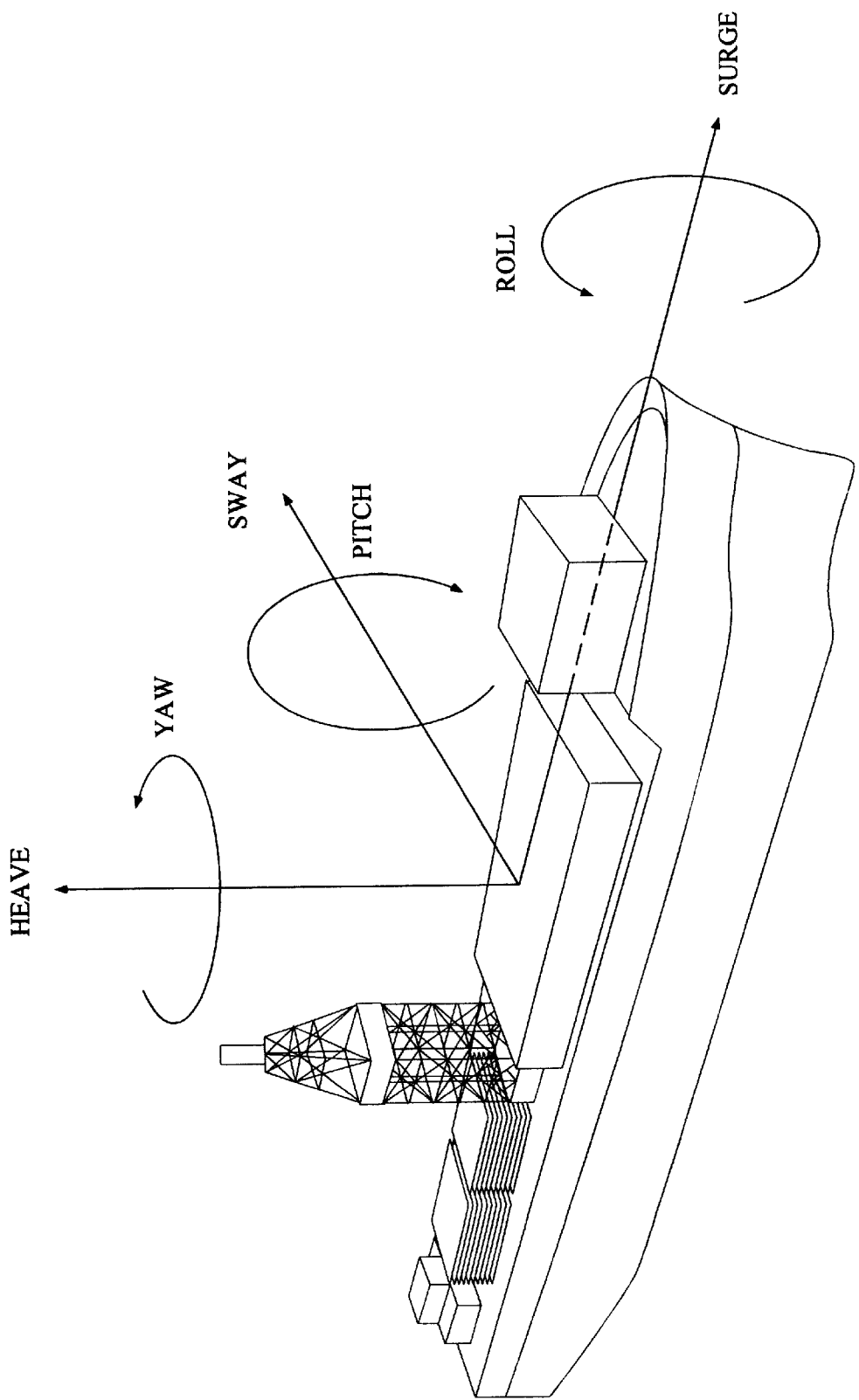
FIG. 1 illustrates a coordinate convention used to denote displacements and motions of floating structures.
Figure 2:
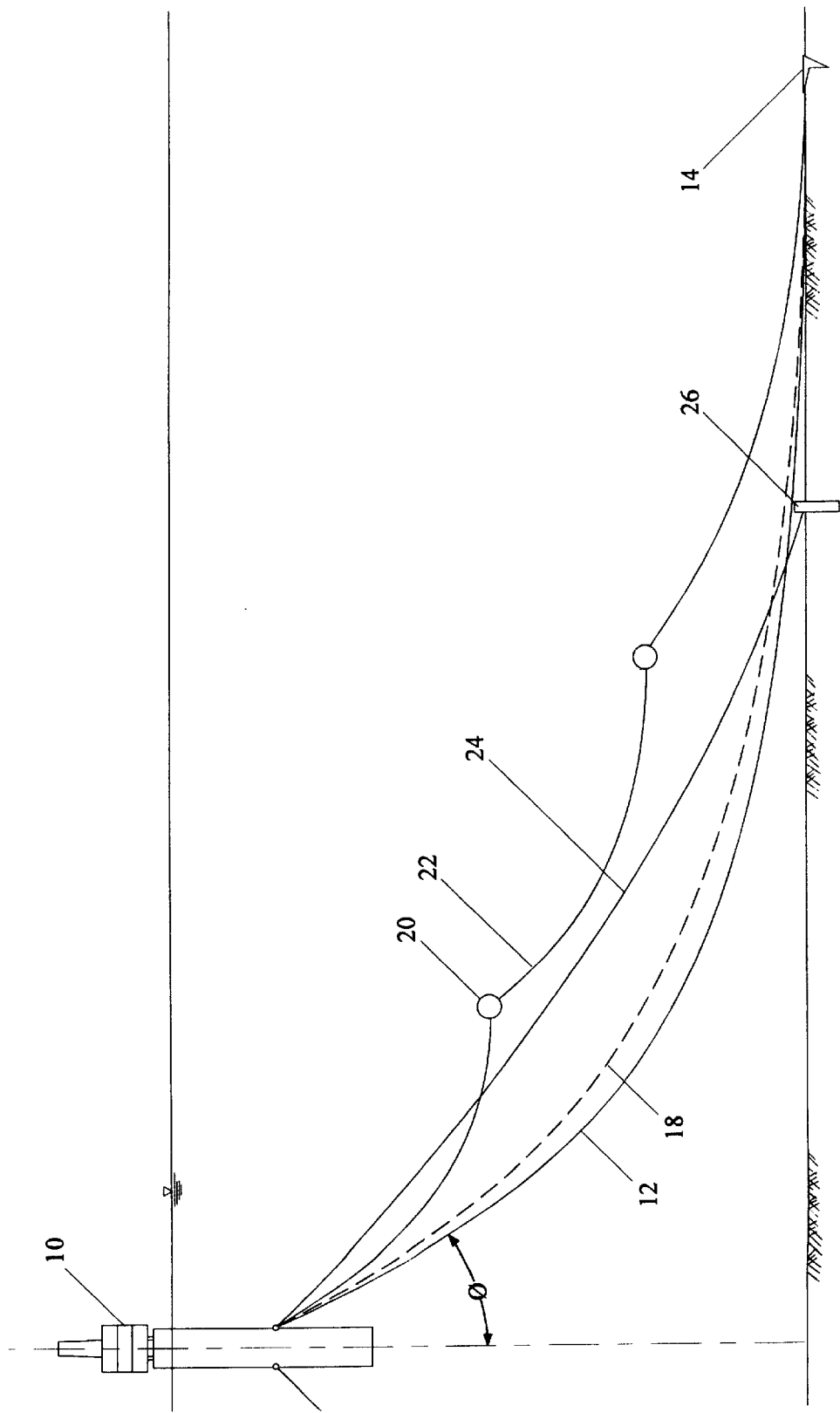
FIG. 2 illustrates a generalization of three mooring line configurations employed by floating structures.
Figure 3:
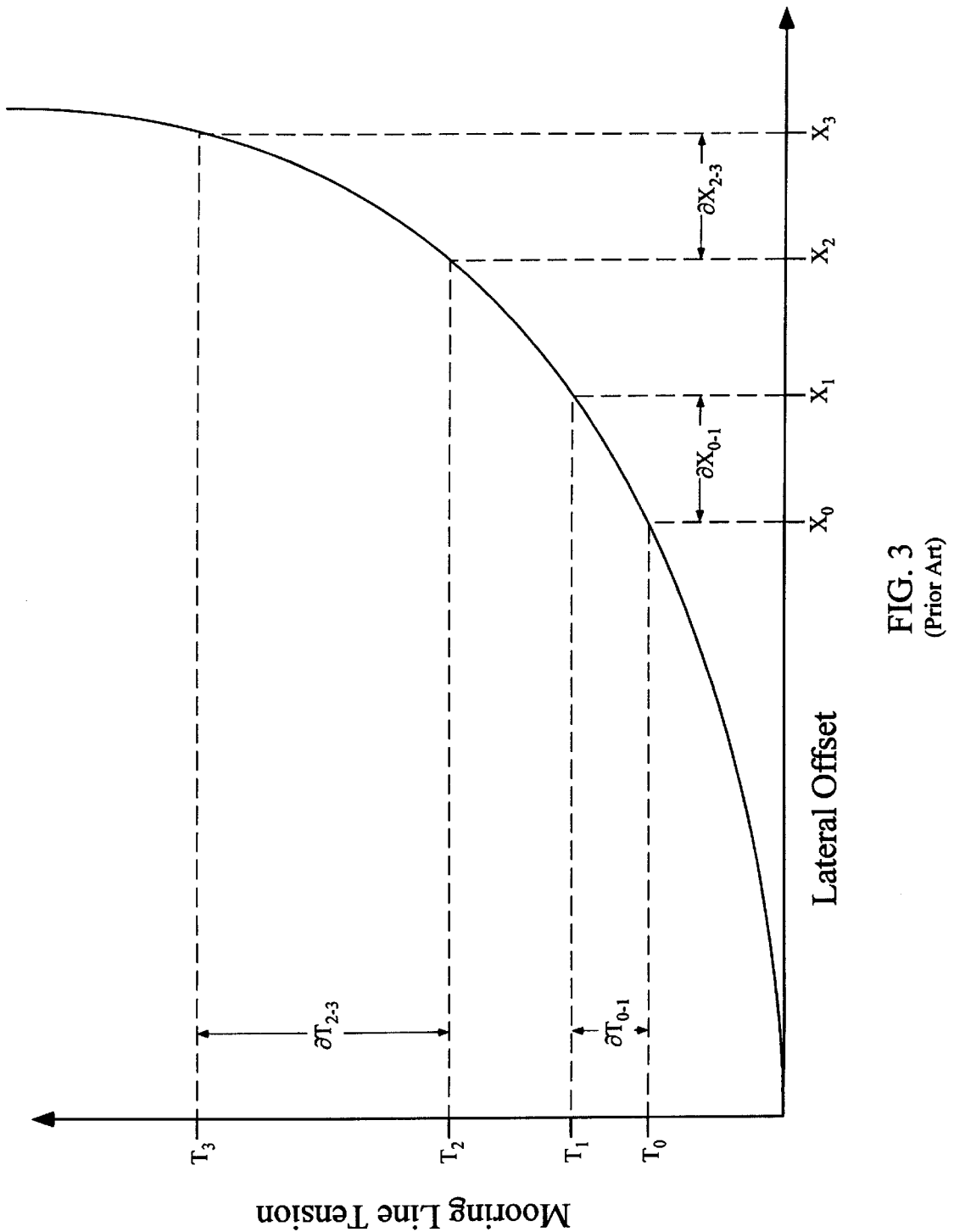
FIG. 3 illustrates a generalization of a mooring line tension versus lateral offset curve for a moored floating structure.
Figure 4:
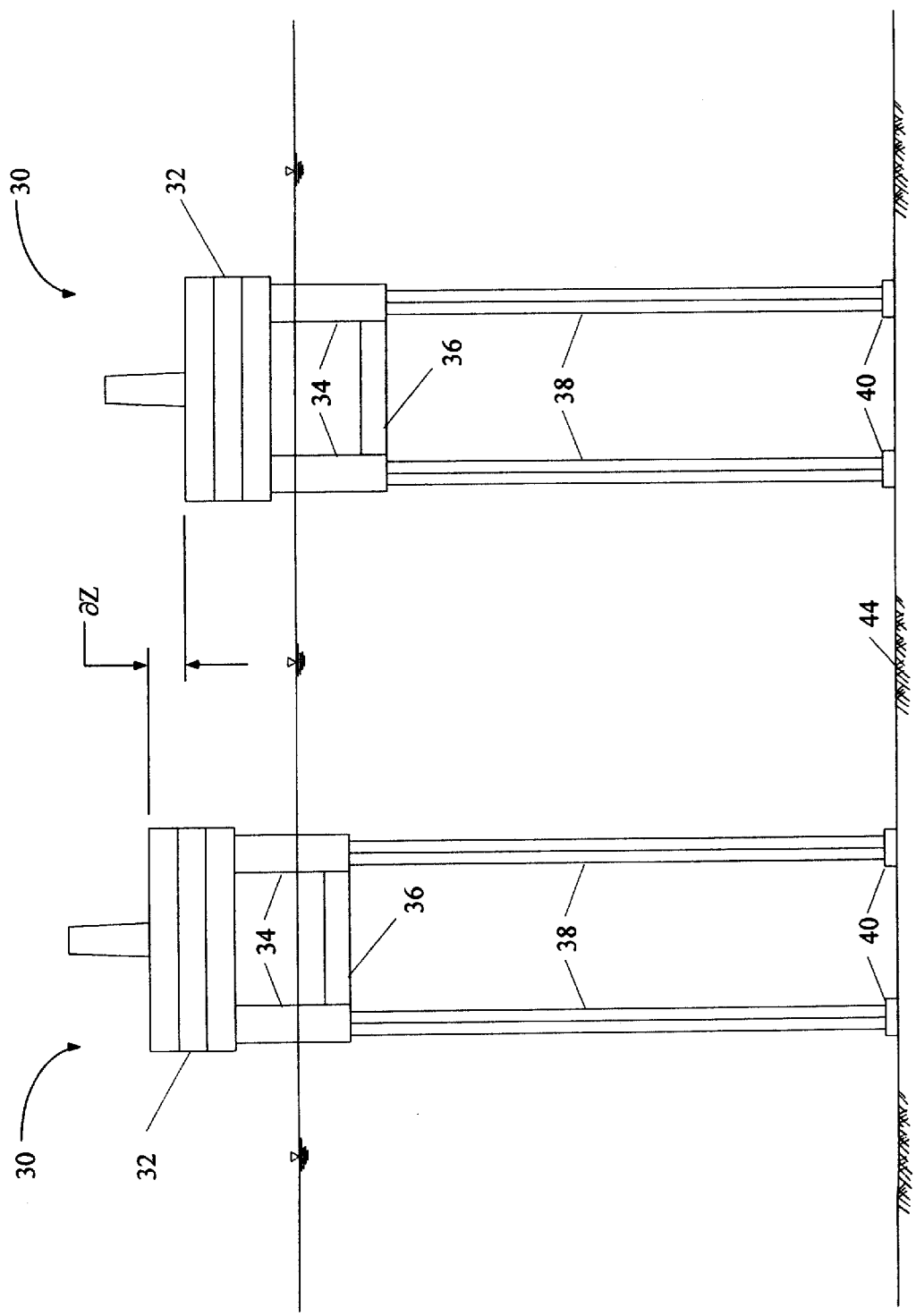
FIG. 4 illustrates a generalization of a marine tendon configuration employed by floating structures.
Figure 5A:
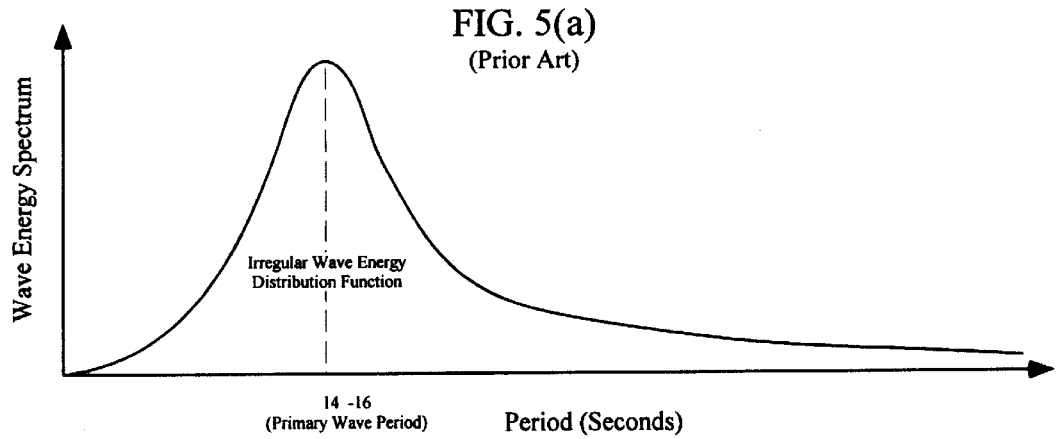
FIGS. 5A—5C illustrate a generalization of a frequency spectrum response analysis for a floating structure.
Figure 5B:
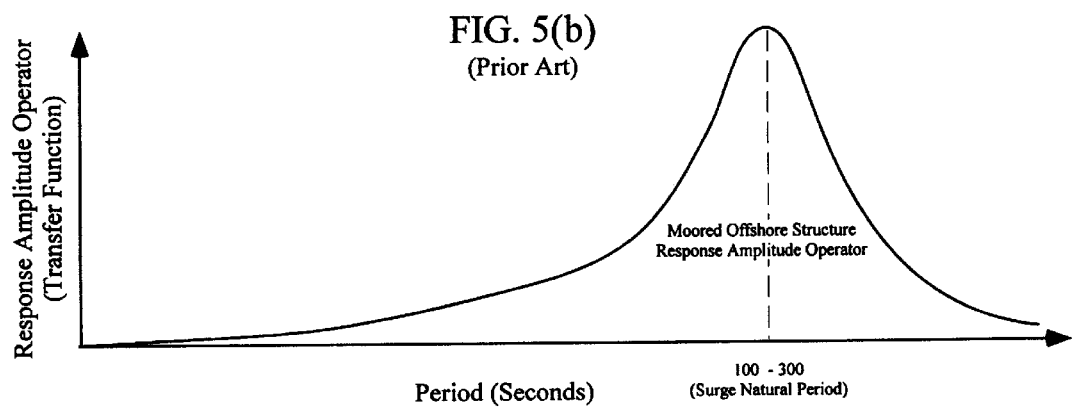
Figure 5C:
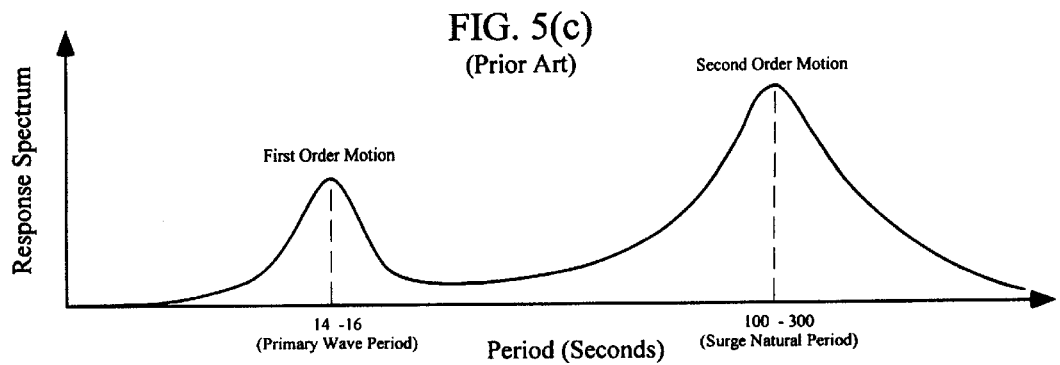
Figure 7:
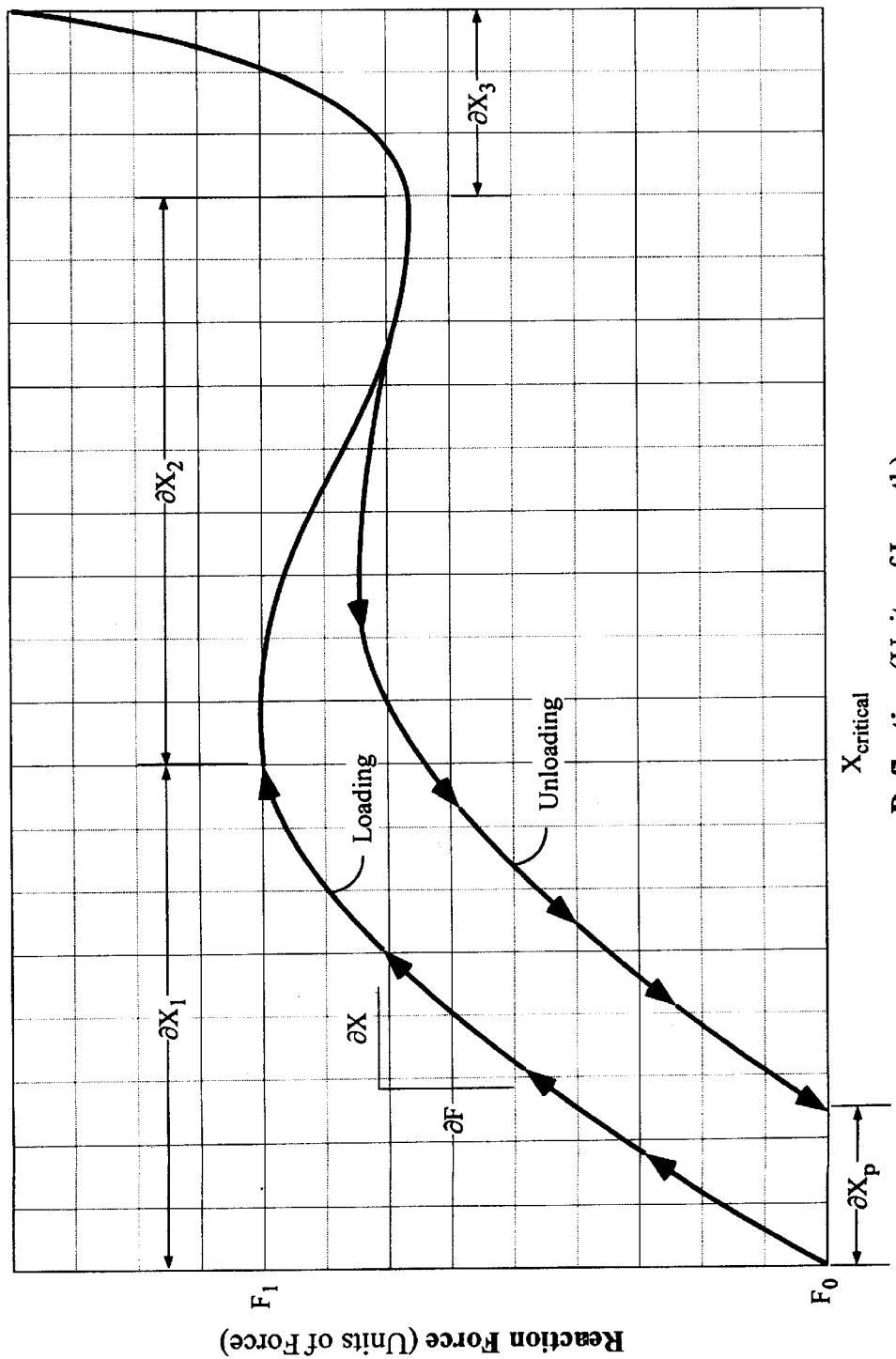
FIG. 7 illustrates a generalization of a reaction force versus deflection curve for a buckling column spring having reaction force drop-off in the buckled range of deflection and an amount of permanent plastic deflection upon unloading.
Figure 8H:
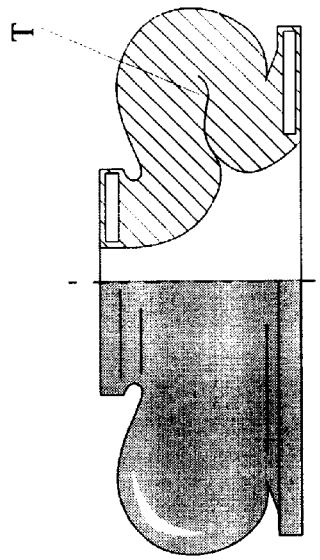
Figure 8G:
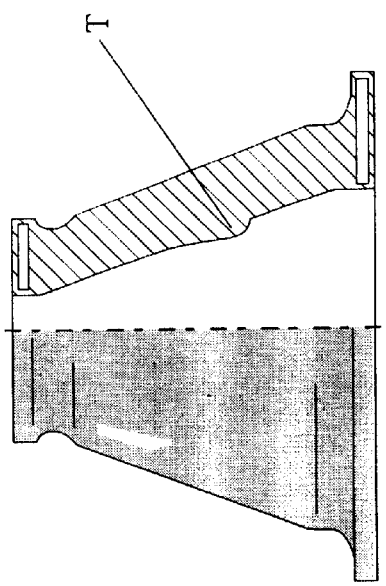
Figure 8I:
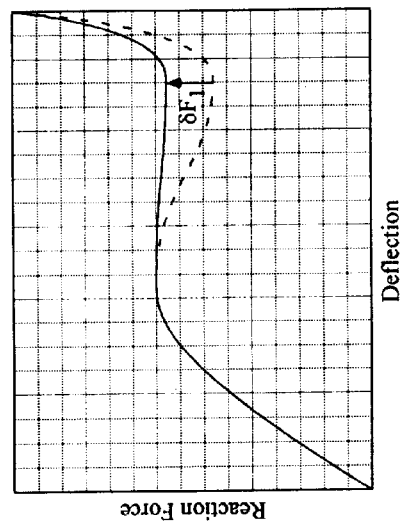
Figure 9:
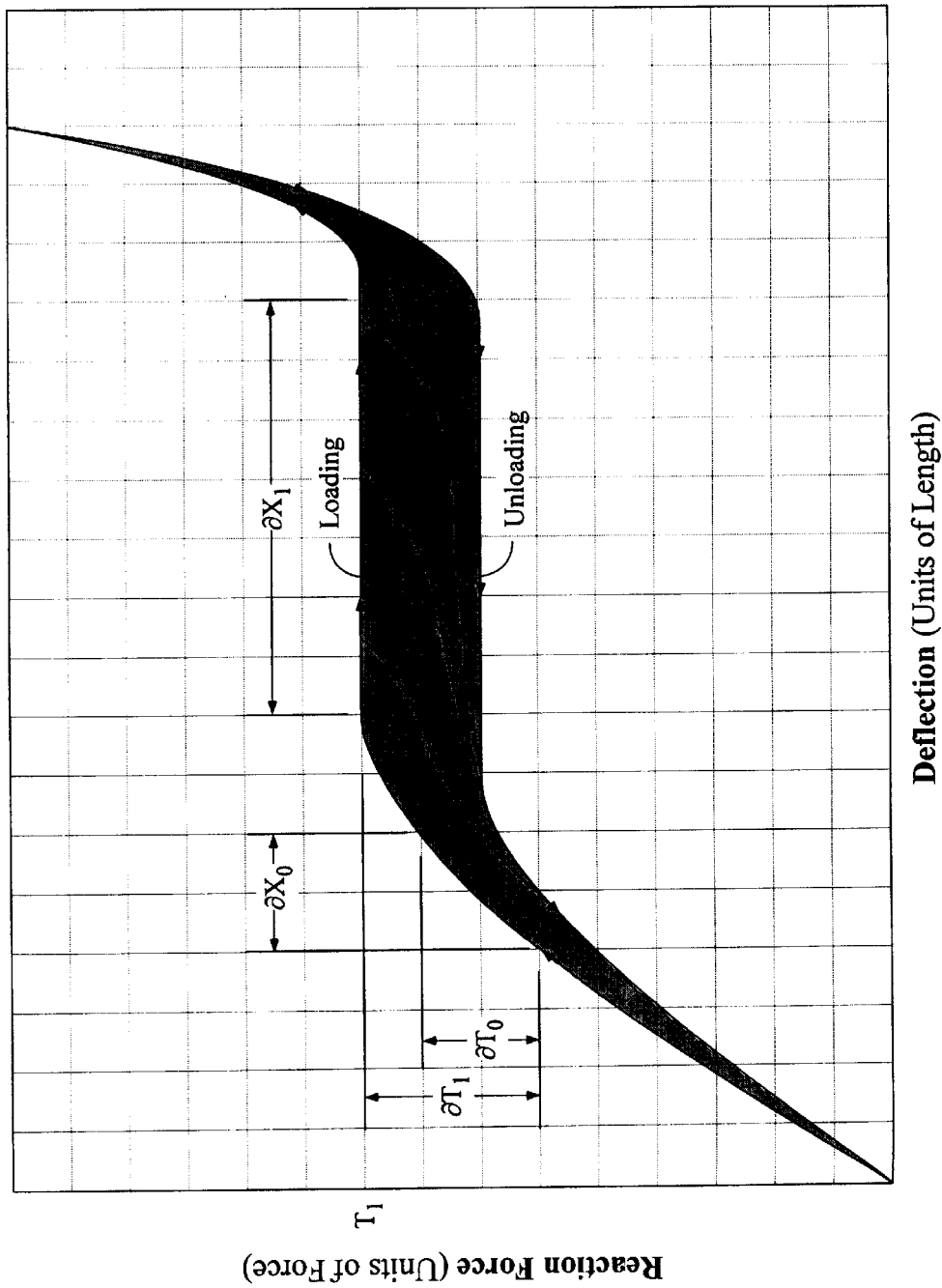
FIG. 9 illustrates a generalization of a reaction force versus deflection curve for a spring having a substantially constant reaction force range and hysteresis characteristic.

Referring to the drawings wherein like characters are used for like parts throughout the several views, FIG. 10A depicts a collapsible elastomer energy cell 100 which comprises a top plate 102, a bottom plate 104, and a buckling elastomer spring, e.g., outer tapered elastomer cylinder 114, connected between the top plate 102 and the bottom plate 104. The top plate 102 includes a central aperture 108 and several vent holes 110. As shown in FIG. 10B, the bottom plate 104 also includes a central aperture 112 and several vent holes 113. A second buckling elastomer spring, e.g., inner tapered elastomer cylinder 106, is disposed within the outer tapered elastomer cylinder 114 and connected between the top plate 102 and the bottom plate 104.

In operation, the collapsible energy cell 100 starts in an undeformed, uncollapsed, or normal state, as indicated in FIGS. 10A and 10B. When the energy cell 100 is compressed, the elastomer cylinders 106 and 114 go through an initial range of linear deflections. Upon exceeding the linear range of deflections, the inner elastomer cylinder 106 and the outer elastomer cylinder 114 buckles through a range of deflections to arrive at the buckled or deformed configuration shown in FIG. 10C. The energy cell 100 moves to the collapsed state as the elastomer cylinders 106 and 114 buckle. The essential function of the buckling elastomer springs is to implement a spring-like response that has a roughly flat or slowly increasing range of non-linear deflection, i.e., non-decreasing reaction force, on the force versus deflection curve and the capacity to withstand repetitive loading in the non-linear range.

When the energy cell 100 is employed in seawater, certain adaptations of the energy cell 100 may be required to account for various operational and environmental conditions, such as corrosion, marine growth, and temperature effects. These adaptations will be readily apparent to one of ordinary skill in the art. For example the top and bottom plates 102 and 104 may require protective coatings or cathodic protection. Other adaptations may also be desirable to achieve improved performance, such as eliminating reaction force drop-off in the non-linear range and increasing the buckling load capacity of a given spring size.

Figure 11B:
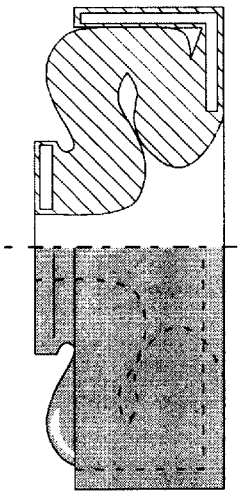
Figure 11A:
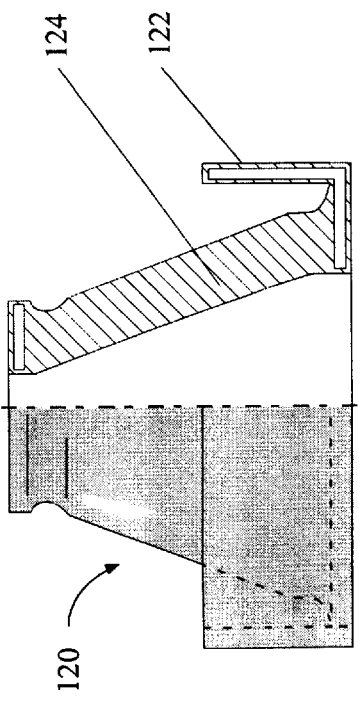

Referring to FIG. 11A, an alternate energy cell 120 includes a skirt 122 placed around a buckling elastomer spring 124. The skirt 122 may either by a rigid cylinder, e.g., a steel cylinder, or an elastomer cylinder. In operation, after the elastomer spring 124 buckles and when the reaction force of the elastomer spring 124 begins to drop off, the skirt 122 engages the buckling walls of the elastomer spring 124, restraining the extent of buckling and forcing the reaction force up. This is one method of eliminating reaction force drop-off in the non-linear range of deflection of the elastomer spring 124.

Figure 11C:
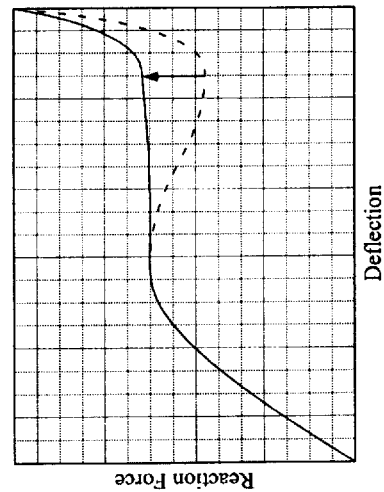
Figure 11D:
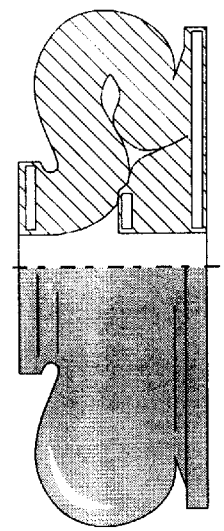
Figure 11E:
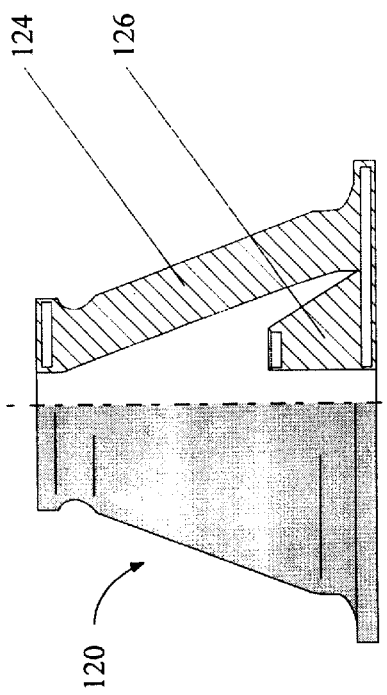
Figure 11F:
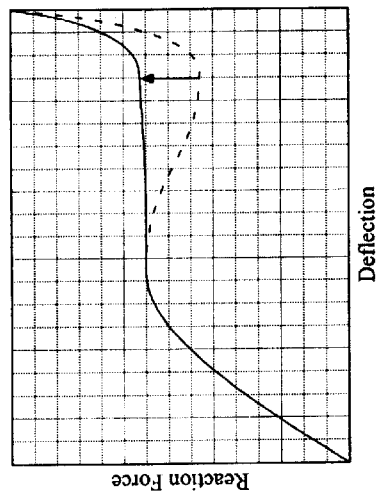

Instead of placing a skirt 122 around the elastomer spring 124, a second inner spring 126 may be inserted inside the elastomer spring 124, as shown in FIG. 11B. The inner spring 126 may be a linear spring or a buckling spring as required. In this way, after the elastomer spring 124 buckles and the reaction force of the elastomer spring 124 begins to drop off, the inner spring 126 engages the elastomer spring 124 to provide additional reaction force. Alternatively, as shown in FIG. 11C, a second elastomer spring 128 may be placed within the elastomer spring 124 to both eliminate reaction force drop-off and increase the buckling load capacity of the energy cell. The reaction force versus deflection curves of the elastomer springs 124 and 128 are additive. The characteristics of each component can be manipulated to give the desired combined reaction force versus deflection curve.

Two or more energy cells may be combined to obtain different reaction force versus deflection characteristics. Symbolic representations of tensioning devices employing various combinations of energy cells are shown in FIGS. 12A–12D. The reaction force versus deflection characteristics corresponding to the different combination of energy cells are shown in FIG. 13.

Figure 12A:
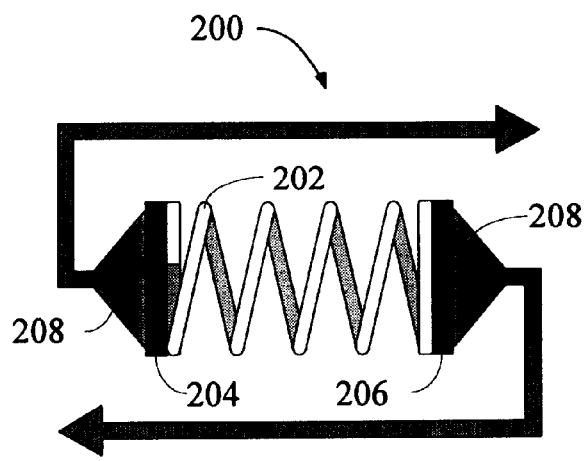
FIGS. 12A—12D illustrate various combinations and arrangements of energy cells and attachment of these energy cells to tensile elements.
Figure 13:
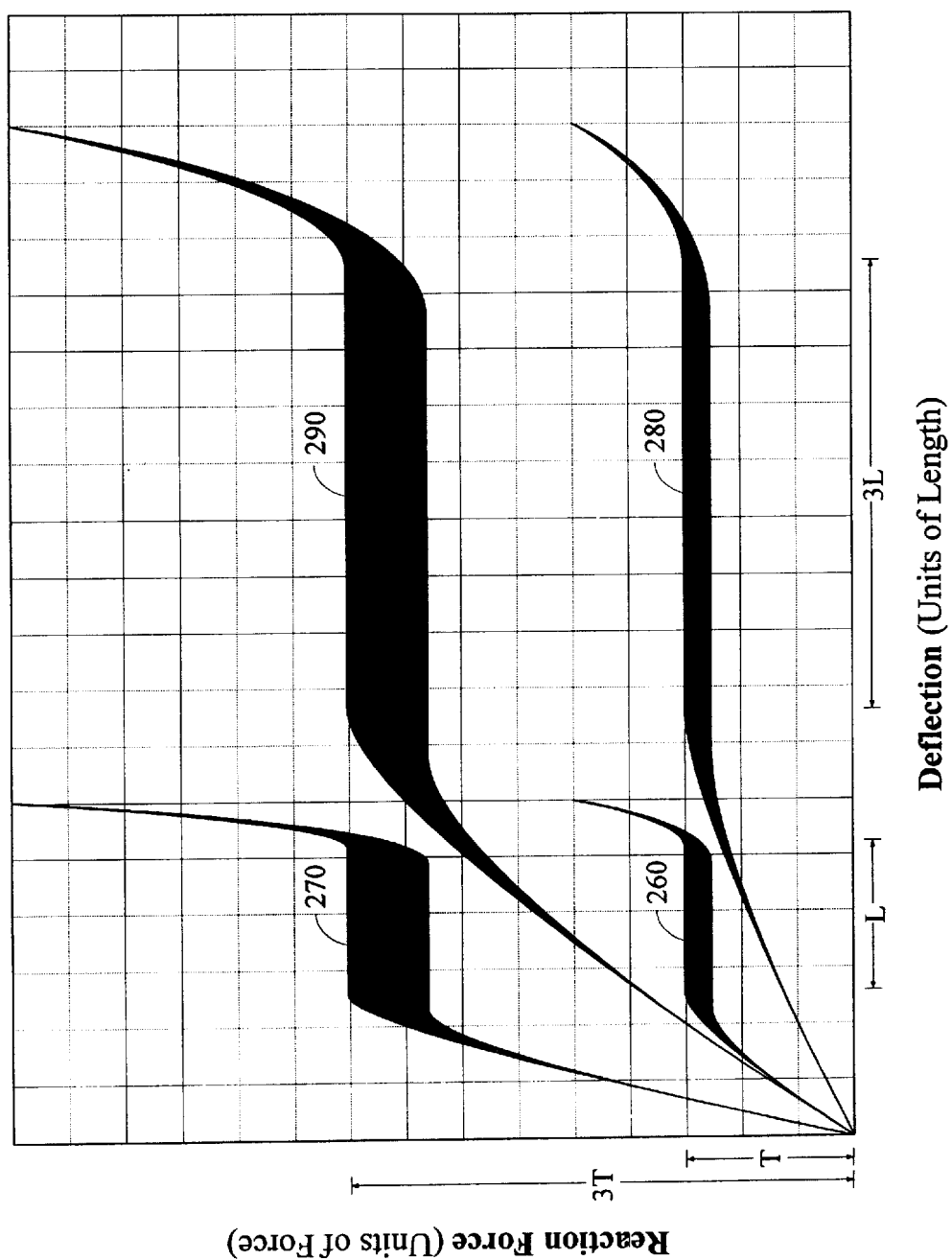
FIG. 13 illustrates a generalized reaction force versus deflection curve for the spring combinations shown in FIGS. 12A–12D.

Referring to FIG. 12A, a tensioning device 200 includes a single energy cell 202 mounted between end plates 204 and 206. Tensile elements 208 apply tensile forces to the energy cell 202 in the directions indicated by the arrows. As shown, the tensile forces applied by the tensile elements 208 will induce compressive forces in the energy cell 202.

Figure 12B:
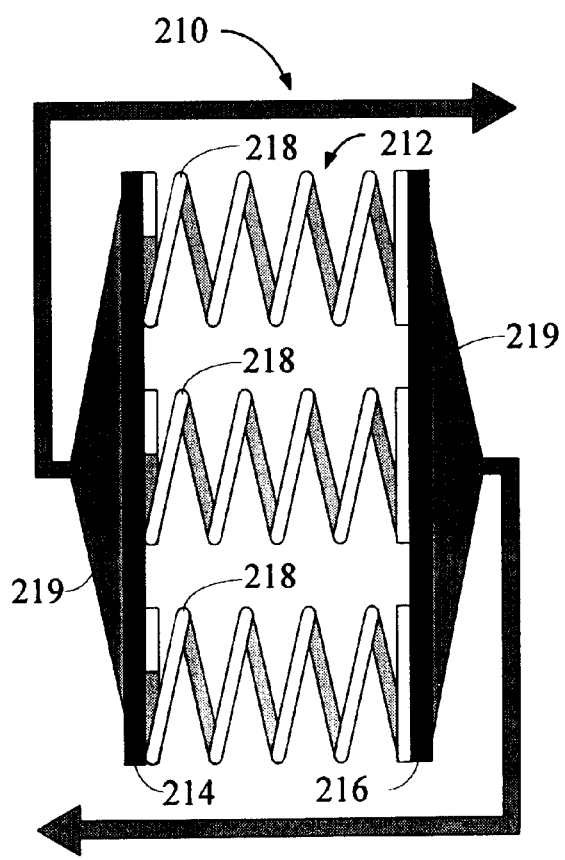

Referring to FIG. 12B a tensioning device 210 includes an energy cell assembly 212 mounted between end plates 214 and 216. The cell assembly 212 includes three energy cells 218 which are arranged in parallel between the end plates 214 and 216. Tensile elements 219 apply tensile forces to the three energy cells 218 in the directions indicated by the arrows.

Figure 12C:
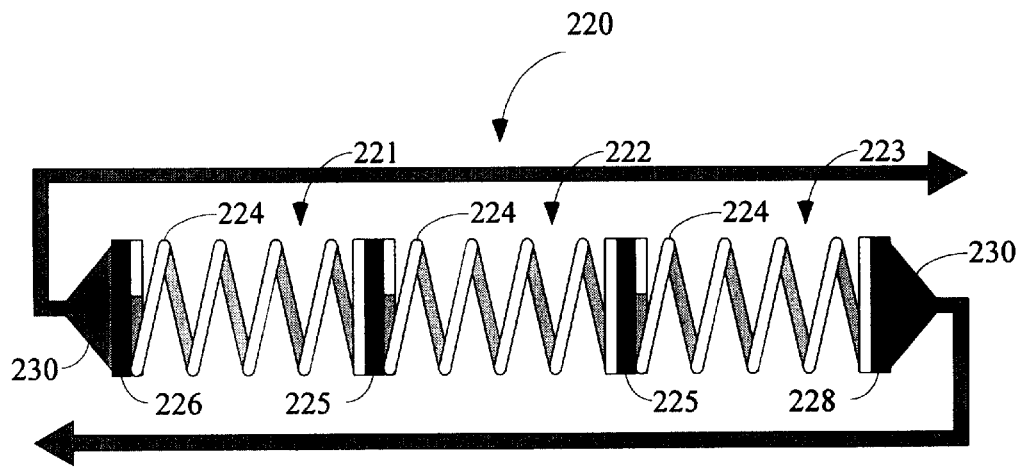

Referring to FIG. 12C, a tensioning device 220 includes three energy cells 221, 222, and 223 mounted between end plates 226 and 228 and linked in series by support plates 225. Tensile elements 230 apply tensile forces to the three energy cells 221, 222, and 223 in the directions indicated by the arrows.

Figure 12D:
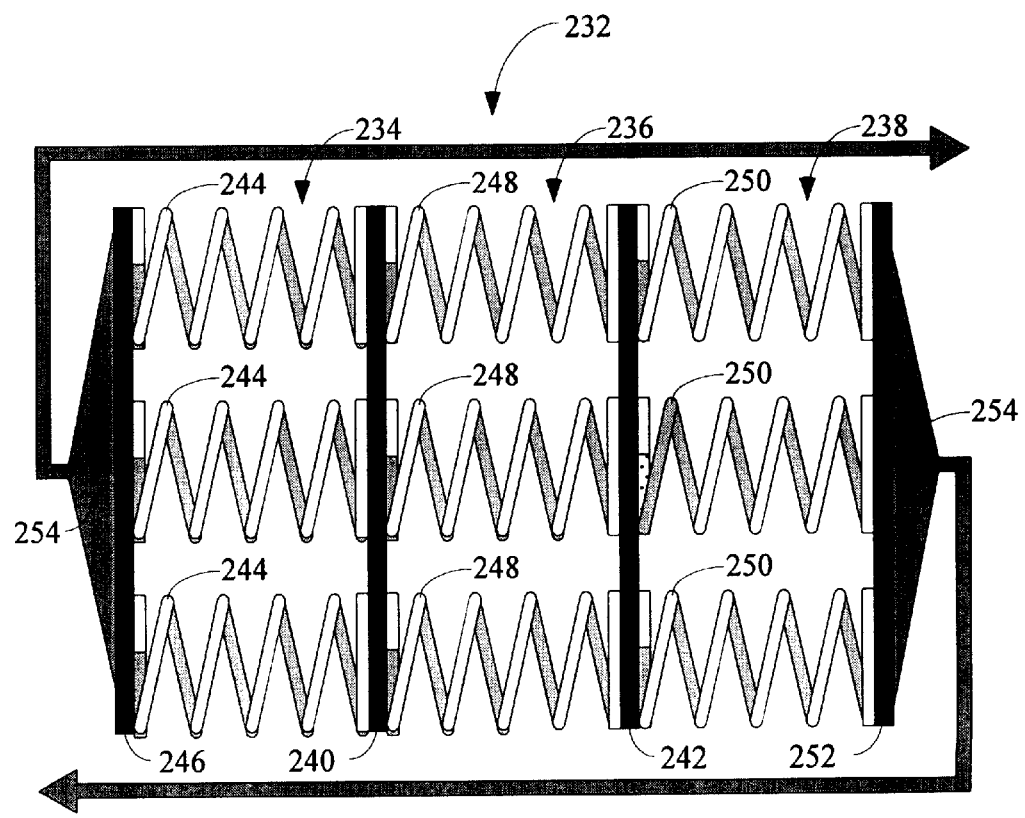

Referring to FIG. 12D, a tensioning device 232 includes energy cell assemblies 234, 236, and 238. The energy cell assemblies 234, 236, and 238 are linked in series by support plates 240 and 242. The cell assembly 234 includes three energy cells 244 which are arranged in parallel between an end connector 246 and the support plate 240. The cell assembly 236 includes three energy cells 248 which are arranged in parallel between the support plates 240 and 242. The cell assembly 238 includes three energy cells 250 which are arranged in parallel between the support plate 246 and an end plate 252. Tensile elements 254 apply tensile forces to the energy cells 244, 248, and 250 in the directions indicated by the arrows.

Referring to FIG. 13, when tensile forces are applied to the tensioning device 200 in the directions indicated by the arrows in FIG. 12A, the energy cell 202 may have a reaction force versus deflection characteristic as indicated by the hysteresis loop 260. As shown, the energy cell 202 has a roughly constant reaction force (T) through a range of plastic deflection of length (L).

When tensile forces are applied to the tensioning device 210 in the directions indicated by the arrows in FIG. 12B, the energy cell assembly 212 may have a combined reaction force versus deflection characteristic as indicated by the hysteresis loop 270. As shown, the parallel combination of energy cells in the tensioning device 210 provides a roughly constant reaction force of magnitude (3T) through a range of deflection of length (L). In other words, the hysteresis loop 270 is the hysteresis loop 260 heightened by a factor of three or the number of energy cells arranged in parallel in the tensioning device 210. A parallel combination of energy cells has the effect of increasing the slope of the reaction force versus deflection curve through the initial range of elastic deformation of the energy cell assembly 212. This increased slope effectively increases the change in reaction force for a given range of linear deflections through the elastic deformation range.

When tensile forces are applied to the tensioning device 220 in the directions indicated by the arrows in FIG. 12C, the serially-arranged energy cells 221, 222, and 223 may have a reaction force versus deflection characteristic as indicated by the hysteresis loop 280. As shown, the series combination of the energy cells in the tensioning device 220 provides a roughly constant reaction force of magnitude (T) through a range of deflection of length (3L). In order words, the hysteresis loop 280 is the hysteresis loop 260 elongated by a factor of three or the number of energy cells arranged in series. By elongating the hysteresis loop, the slope of the reaction force versus deflection curve through the initial range of the elastic deformation of the combined energy cells 221, 222, and 223 is reduced. This reduction in slope effectively reduces the change in reaction force for a given range of linear deflections through the elastic deformation range.

When tensile forces are applied to the tensioning device 232 in the directions indicated by the arrows in FIG. 12D, the serially connected energy cell assemblies 234, 236, and 238 may have a combined reaction force versus deflection characteristic as indicated by the hysteresis loop 290. The hysteresis loop 290 is the hysteresis loop 260 heightened and elongated by a factor of three. The serial-parallel combination of the energy cells in the tensioning device 232 provides a roughly constant reaction force of magnitude (3T) through a range of length (3L). Essentially, the symmetric combination of cells in series and parallel is equivalent to multiplying the size of a single cell by a factor.

Other combinations of energy cells, which may be symmetric or non-symmetric, may be used to further vary the reaction force versus deflection characteristic. Generally, when energy cells are connected in parallel, the reaction force versus deflection characteristic is heightened by a factor equal to the number of cells arranged in parallel. When energy cells are connected in series, the reaction force versus deflection characteristic is elongated by a factor equal to the number of cells connected in series.

Combining energy cells in series or parallel allows design flexibility. Subject to practical limitations apparent to those of skill in the art, combining cells in parallel allows for extremely high tension loads. An energy cell may be selected to provide non-linear deflection at a whole number fraction of a desired tensile force. Cells may then be connected in parallel to achieve the desired tensile force. However, due to the high reaction force capacity provided by available cells, extensive parallel combinations may not be as desirable as simply employing larger cells. Further flexibility is afforded by taking individual cells or sets of cells in parallel and combining these sets in series to flatten the linear portion of the curve to limit tension variations for a given deflection while in the linear range of tensions. Still further flexibility is afforded by combining sets of cells in series to accommodate long lengths of deflection while maintaining a desired tensile force. Also, connecting cells in parallel can be used to alter the hysteresis induced reaction force drop-off for a given stroke length, as generally the amount of drop-off in the reaction-force is reduced for smaller percent of the buckled deflection range experienced.

It should be noted that the shape of the reaction force curve in the non-linear range affects the performance of series and parallel configurations of buckling elastomer springs. While manufacturing tolerances can be controlled, individual springs will buckle at slightly varying reaction forces and the non-linear behavior will also differ between springs. Where any reaction force drop-off occurs post buckling, the first spring to buckle will become the softest link in the configuration. Other springs will expand and force the complete deflection of the softest spring, causing a dip in the reaction force curve. The same pattern then repeats with each subsequent spring, causing multiple dips in the reaction force curve. Reaction force drop-off can also affect rotational stability of individual springs and laterally spaced parallel combinations of springs. These problems can be obviated by eliminating reaction force drop-off by the methods previously discussed. It may be desirable to actually adjust the reaction force curve to provide a slowing increasing reaction force through the non-linear range.

Figure 14:
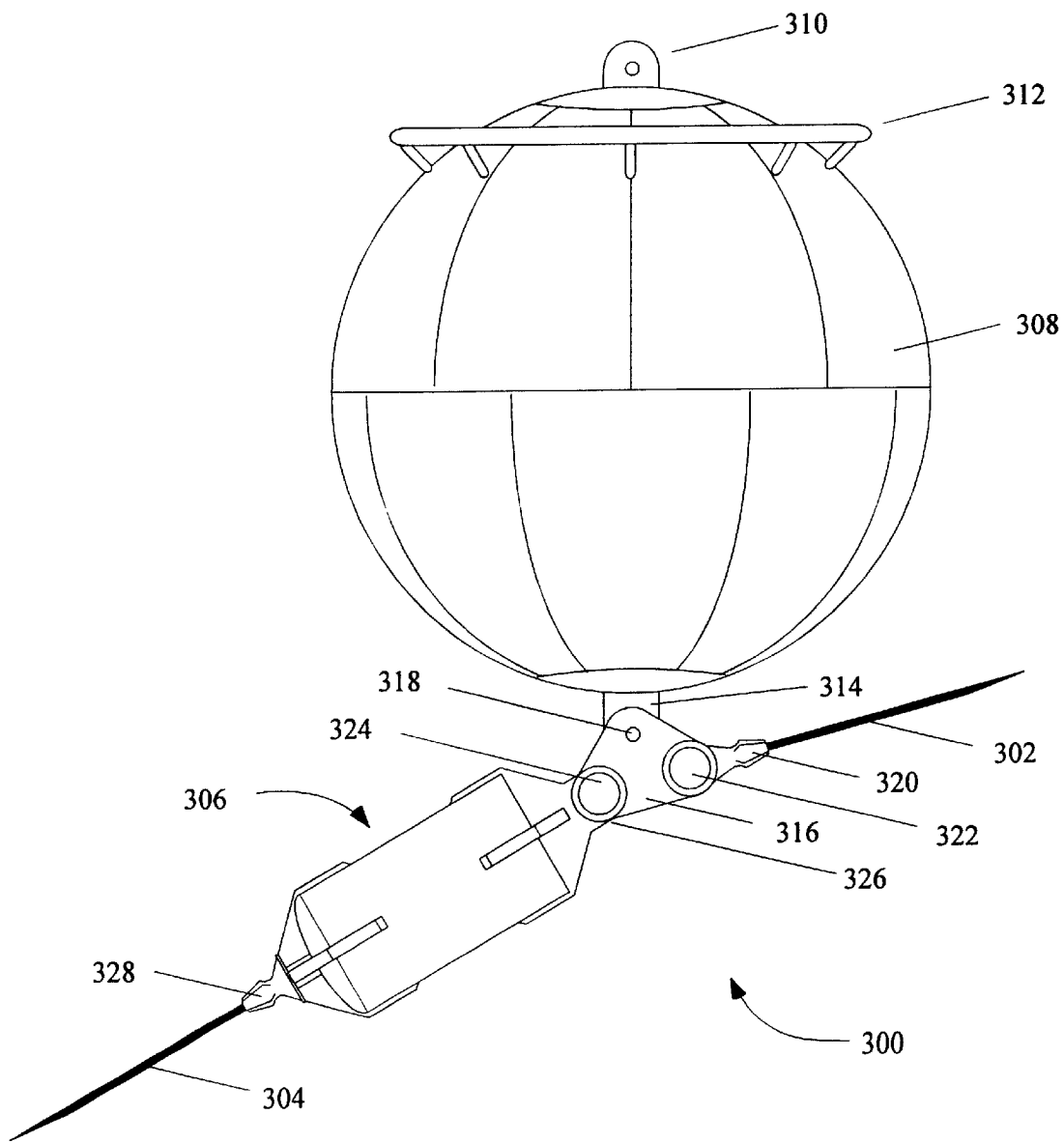
FIG. 14 illustrates a mooring line employing a tension limiting mooring piston.

Referring now to FIG. 14, a mooring system 300 employing energy cells similar to energy cell 100 is shown. The mooring system 300 includes a first mooring line segment 302 which is linked to a second mooring line segment 304 by a tension limiting device or mooring piston 306. One of the mooring line segments may be attached to a floating structure (not shown) and the other may be attached to an anchor on the seafloor or other body. In this way, the mooring system 300 may be used to hold the floating structure about a fixed mean position or station. The mooring piston 306 is arranged to limit tension in the mooring lines segments 302 and 304 to a predetermined maximum value as the floating structure moves laterally.

A buoy 308 is provided to support the weights of the mooring piston 306 and mooring line segments 302 and 304 in water. The buoy 308 has an upper connector plate 310, a guardrail 312, and a lower connector plate 314. A connector plate 316 is pivotally attached to the lower connector plate 314 by a pin 318. A mooring line gripping arm 320 is connected to the connector plate 316 through a hinge joint 322. The mooring line gripping arm 320 connects the first mooring line segment 302 to the connector plate 316. One end of the mooring piston 306 includes a hinge joint 324 which is coupled to a hinge joint 326 on the connector plate 316. The other end of the mooring piston 306 includes a mooring line gripping arm 328 which is connected to the second mooring line segment 304.

Figure 15A:
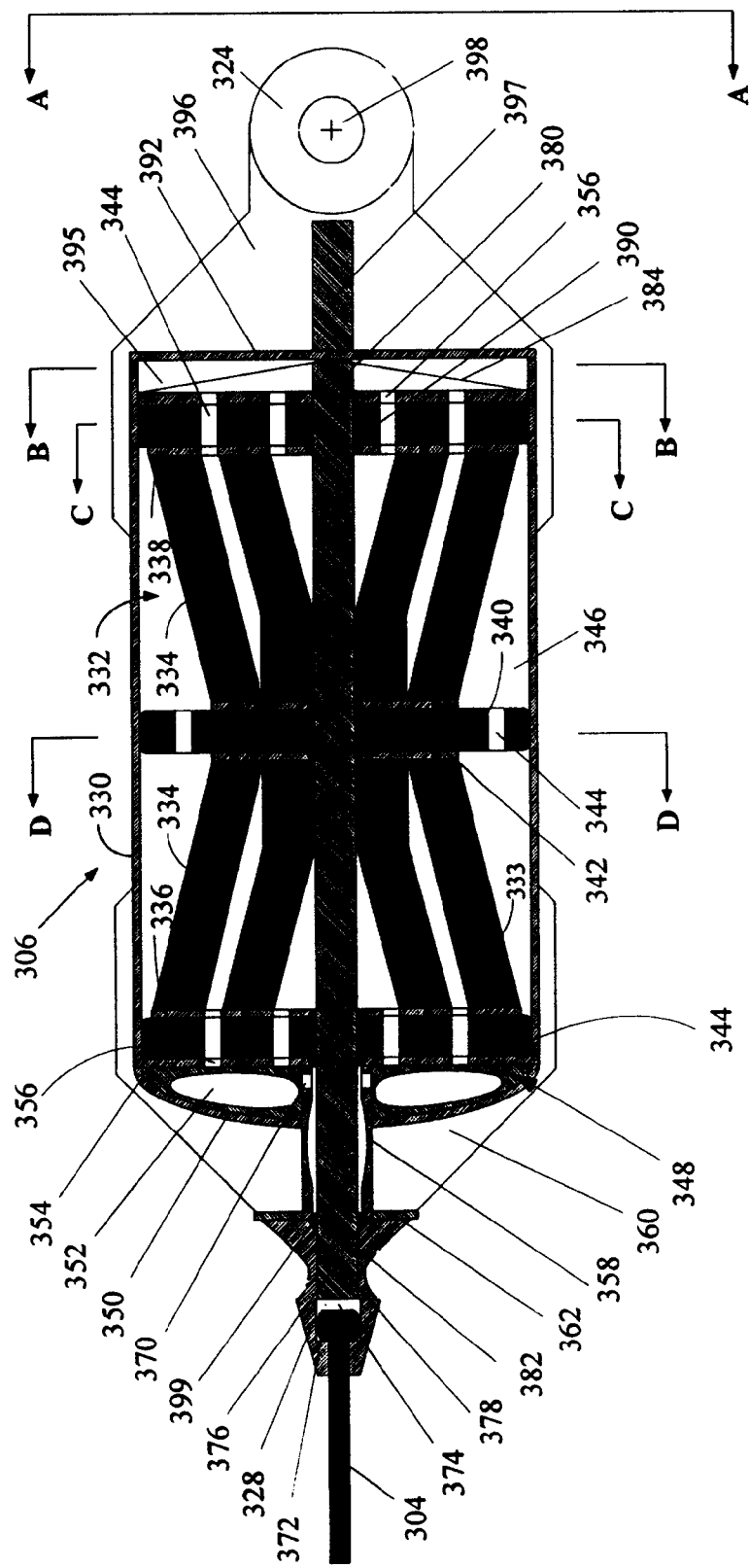
FIG. 15A is a cross-sectional view of the tension limiting mooring piston shown in FIG. 14 in a retracted position.
Figure 15B:
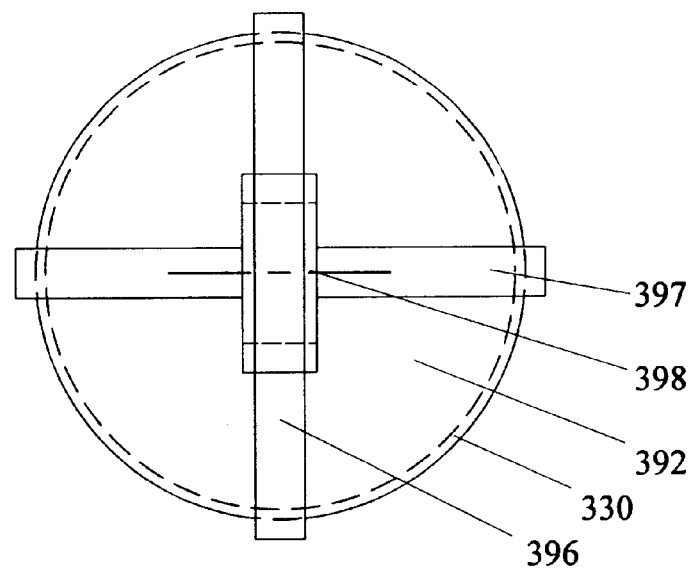
FIG. 15B is an end view of the tension limiting mooring piston shown in FIG. 15A taken generally along line A—A.
Figure 15C:
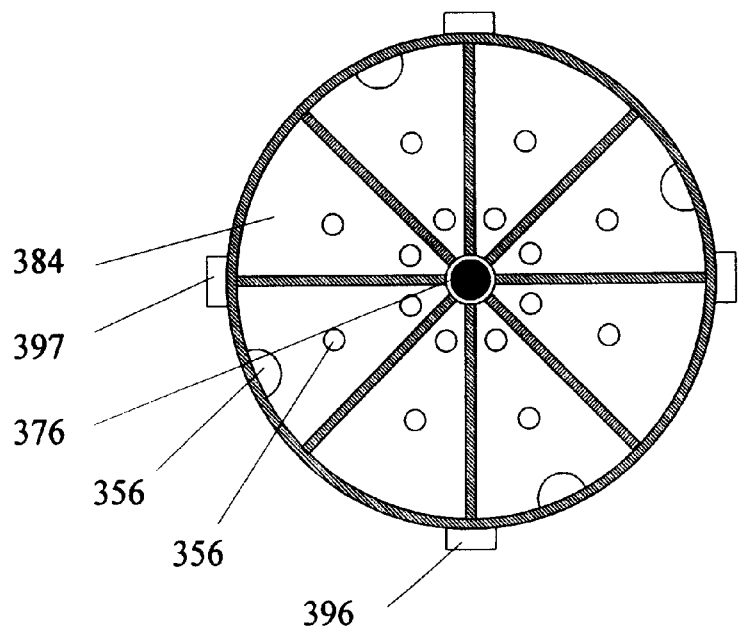
FIG. 15C is a cross-sectional view of the tension limiting mooring piston shown in FIG. 15A taken generally along line B—B.
Figure 15D:
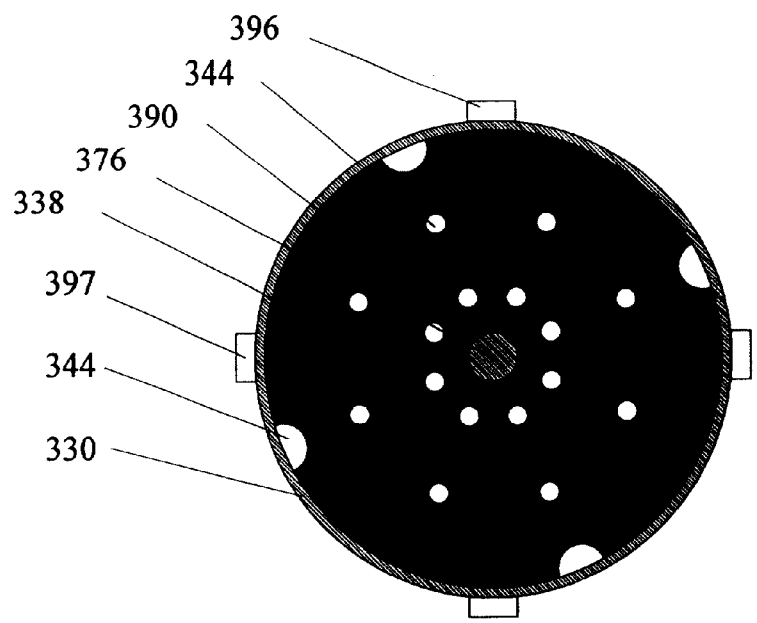
FIG. 15D is a cross-sectional view of the tension limiting mooring piston shown in FIG. 15A taken generally along line C—C.
Figure 15E:
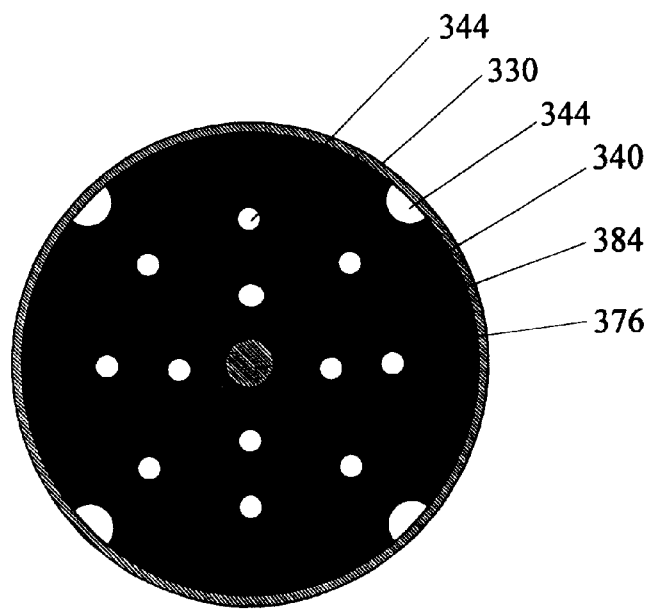
FIG. 15E is a cross-sectional view of the tension limiting mooring piston shown in FIG. 15A taken generally along line D—D.

Referring to FIG. 15A, the mooring piston 306 includes an annular housing 330 which encloses a tension limiting unit 332. The tension limiting unit 332 includes two energy cells 334 which are mounted between end support discs 336 and 338 and intermediate support disc 340 by pins 342. Each energy cell 334 includes buckling elastomer springs 333, similar to the buckling elastomer springs 106 and 114 shown in FIGS. 10A–10C. The support discs 336, 338, and 340 include channels 344 (see FIGS. 15D and 15E) through which fluid may flow into open spaces 346 in the housing 330. A cover 348 is mounted at an end of the housing 330 adjacent the end support disc 336. The cover 348 includes a convex plate member 350, webbed framing members 352, and an end plate 354. The webbed framing members 352 are fixed to an inner surface of the convex plate member 348 in a radial pattern. The end plate 354 is in contact with the end support disc 336 and includes ports 356 which are aligned with the channels 344 in the end support disc 336.

An intake annulus 358 is disposed in an aperture in the cover 348. A cap plate 362 is mounted on the intake annulus 330. The intake annulus 358 is secured to the housing 330 by stiffener plates 360. The stiffener plates 360 are attached to the intake annulus 358 and the housing 330 in a radial pattern. The intake annulus 358 has a venturi-shaped inner surface. Ports 370 are provided in the wall of the intake annulus 358 through which fluid received in the intake annulus 358 may flow into the ports 370 in the end plate 354 and channels 344 in the end support disc 336.

A mooring cap 372 at an end of the second mooring line segment 304 is held in a cavity 374 in the mooring line gripping arm 328. A shaft 376 has a first end 378 and a second end 380. The first end 378 is disposed in an aperture 382 in the mooring line gripping arm 328. An end cap 384 is attached to the second end 380 of the shaft 376. The shaft 376 extends through the intake annulus 358 and central apertures in the support discs 336, 338, and 340 and elastomer springs 333. Rubber donuts 390 are disposed between the shaft 376 and the central apertures in the support discs 336, 338, and 340. The rubber donuts 390 seal between the shaft 376 and the support discs 336, 338, and 340.

An end plate 392 is mounted at an end of the housing 330 adjacent the end cap 384 at the end of the shaft 376. The end cap 384 includes ports 356 (see FIG. 15C) through which fluid in the open spaces 346 may flow into an open space 395 between the end cap 384 and the end plate 392. The end plate 392 is not perforated so that fluid may be trapped in the open space 395. A stiffener plate 396 is attached to the end plate 392 and the housing 330 to secure the end plate 392 to the housing 330. Additional stiffener plates 397 are attached to the housing 330 and the end plate 392 to complete a radial pattern of stiffeners (see FIGS. 15B and 15C). The stiffener plate 392 includes the hinge joint 324 (shown in FIG. 14) which has a circular aperture 398 that is arranged to mate with the mooring line hinge joint 326 on the connector plate 316 (shown in FIG. 14).

Figure 15F:
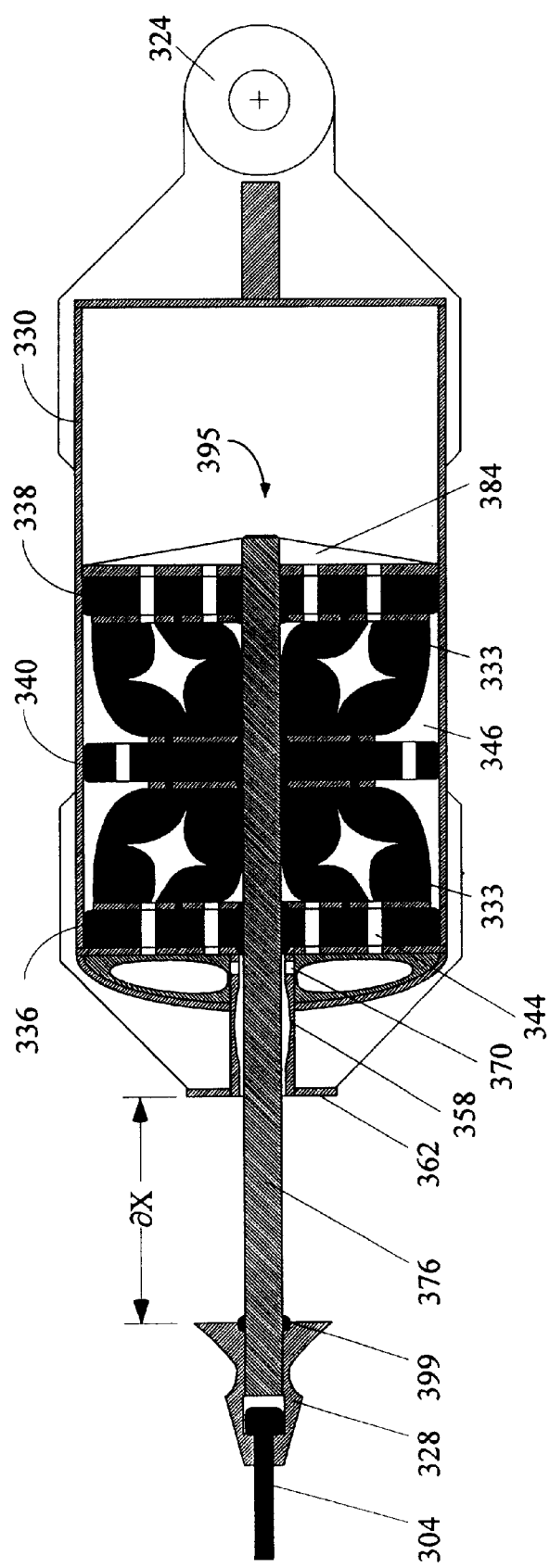
FIG. 15F is a cross-sectional view of the tension limiting mooring piston shown in FIG. 5A in an extended position.

In operation, the shaft 376 is arranged to reciprocate axially within the housing 330 in response to tension variations in the mooring line segments 302 and 304. As shown in FIG. 15A, the shaft 376 is in a retracted position. In this retracted position, the mooring line gripping arm 328 presses against the cap plate 362, sealing off the intake annulus 358 with a rubber seal 399. The elastomer springs 333 are also in a relaxed, unbuckled position. The cap plate 362 separates from the mooring line gripping arm 328 when there is sufficient tension in the mooring line segments 302 and 304. The shaft 376 is shown in an extended position in FIG. 15F. In this extended position, the mooring line gripping arm 328 has separated from the cap plate 362 a distance AX. As the shaft 376 extends out from the housing 330, the shaft 376 compresses the elastomer springs 333, deflecting the springs 333 through a range of linear deformation. The springs 333 buckle when their reaction force reach a certain predetermined limit, i.e., when the range of linear deformation is exceeded.

When the mooring line gripping arm 328 is separated from the cap plate 362, fluid intake into the intake annulus 358 is induced. The fluid in the intake annulus 358 exits through the ports 370 and flows through channels 344 into the open spaces 346 and open space 395 in the housing 330. When the elastomer springs 333 are deflected, the fluid in the open spaces 346 and open space 395 move. This movement of fluid provides viscous damping to the floating structure. Viscous damping may be enhanced by designing flow paths in the housing 330 to impede the velocity of fluid flow through the intake annulus 358 and the various ports and channels in the support discs 336, 338, and 340 and the end cap 384.

The hysteresis characteristics of the elastomer springs 333 also add damping to the mooring system 300. Viscous damping of the mooring system may be further enhanced by designing the elastomer springs 333 to have a large hysteresis characteristics. The support discs 336, 338, and 340 may be made of an abrasion-resistant, hardened rubber having a modulus of elasticity an order of magnitude higher than the modulus of elasticity of the elastomer springs 333 and with compressive failure load at least an order of magnitude in excess of a buckling tension for the elastomer springs.

Figure 16:
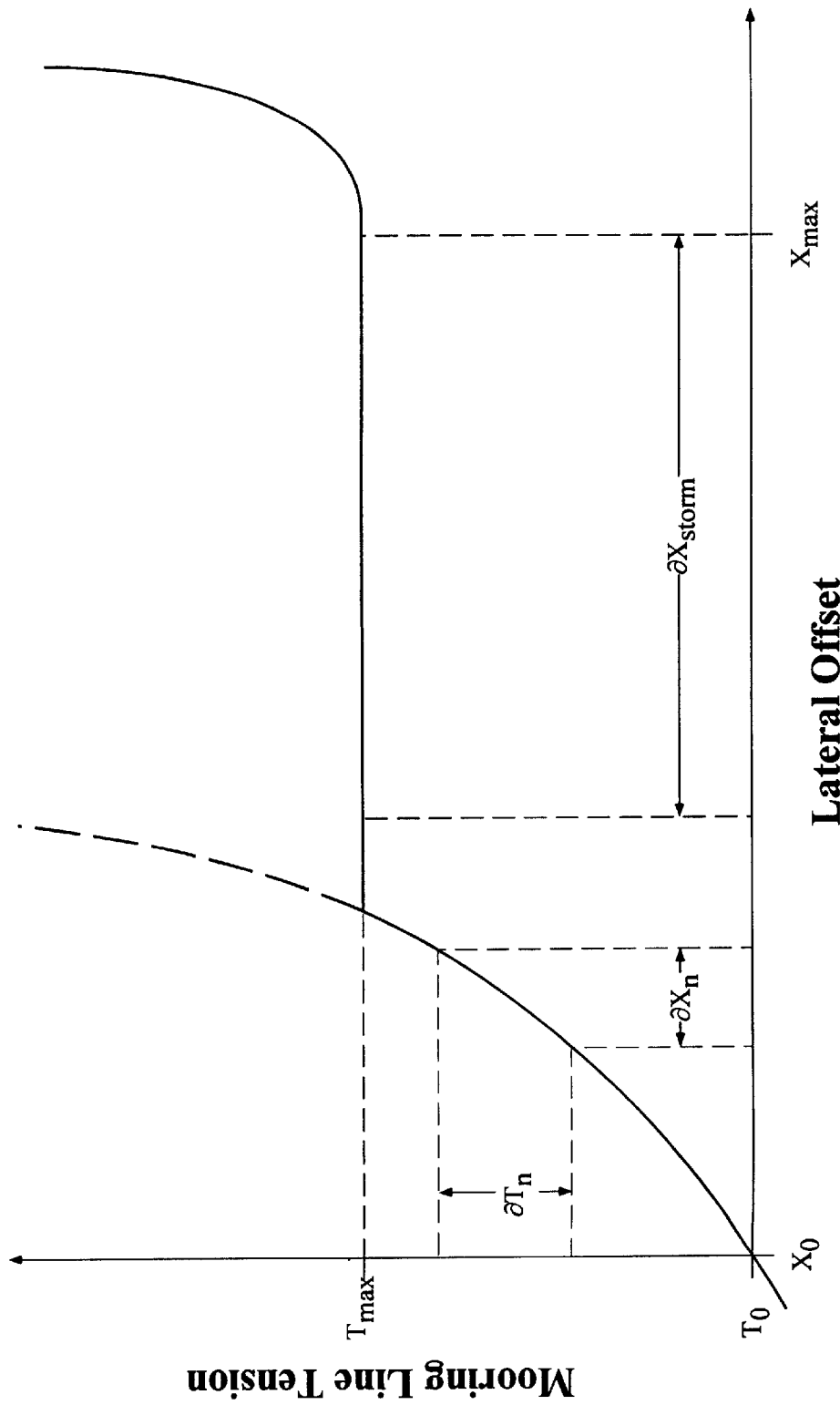
FIG. 16 is a plot of mooring line tension versus lateral offset for the mooring line shown in FIG. 14.

Referring to FIG. 16, an exemplary mooring line tension versus physical offset characteristic for the mooring system 300 (shown in FIG. 14) is shown. The elastomer springs 333 (shown in FIG. 15A) have been selected and arranged to have a range of deflections at a given reaction force $T_{max}$. The physical offset at which the reaction force $T_{max}$ begins is called a critical loading level. The elastomer springs 333 are preferably pre-compressed through at least a portion of the linear deformation range toward the critical loading level.

Below the transition loading level, the elastomer springs 333 essentially act as a rigid connector. Thus, the mooring system 300 displays a mooring line tension versus physical offset curve that is similar to that of a traditional mooring line which does not employ tension limiting mooring piston. When the normal operating range of lateral oscillations occurs in the range $\partial X_n$ for a mooring line pre-tensioned to $T_0$, the normal operating tension variation in the mooring line will be $\partial T_n$. This physical offset corresponds to a base region in which the floating structure is allowed to move. When storm conditions occur and induce lateral oscillations in a range $\partial X_{storm}$, far from the equilibrium position $X_0$, instead of following the dotted line curve of a traditional mooring line, the elastomer springs will collapse and tension in the mooring line will be limited to $T_{max}$. In the collapsed state of recoverable plastic deflection, the tension in the mooring line is static while the floating structure is allowed to move through a deflection region $\partial X_{storm}$. The tension variations in the mooring system 300 is also limited during the storm period.

To accommodate a large $\partial X_{storm}$, several tension limiting devices with a greater number of elastomer springs stacked in series may be employed. In this manner, the absolute tension variations experienced by a mooring line is limited as shown between the selected $T_{max}$, and the lower tension experienced. Further, the tension limitation will allow for much higher mooring line pre-tension, by capping the maximum design line tension to $T_{max}$. Finally, a certain portion of the service life of the mooring line is spent under roughly constant tension, such as during storm conditions, thus reducing the absolute number of cyclic tension variations experienced.

Figure 17:
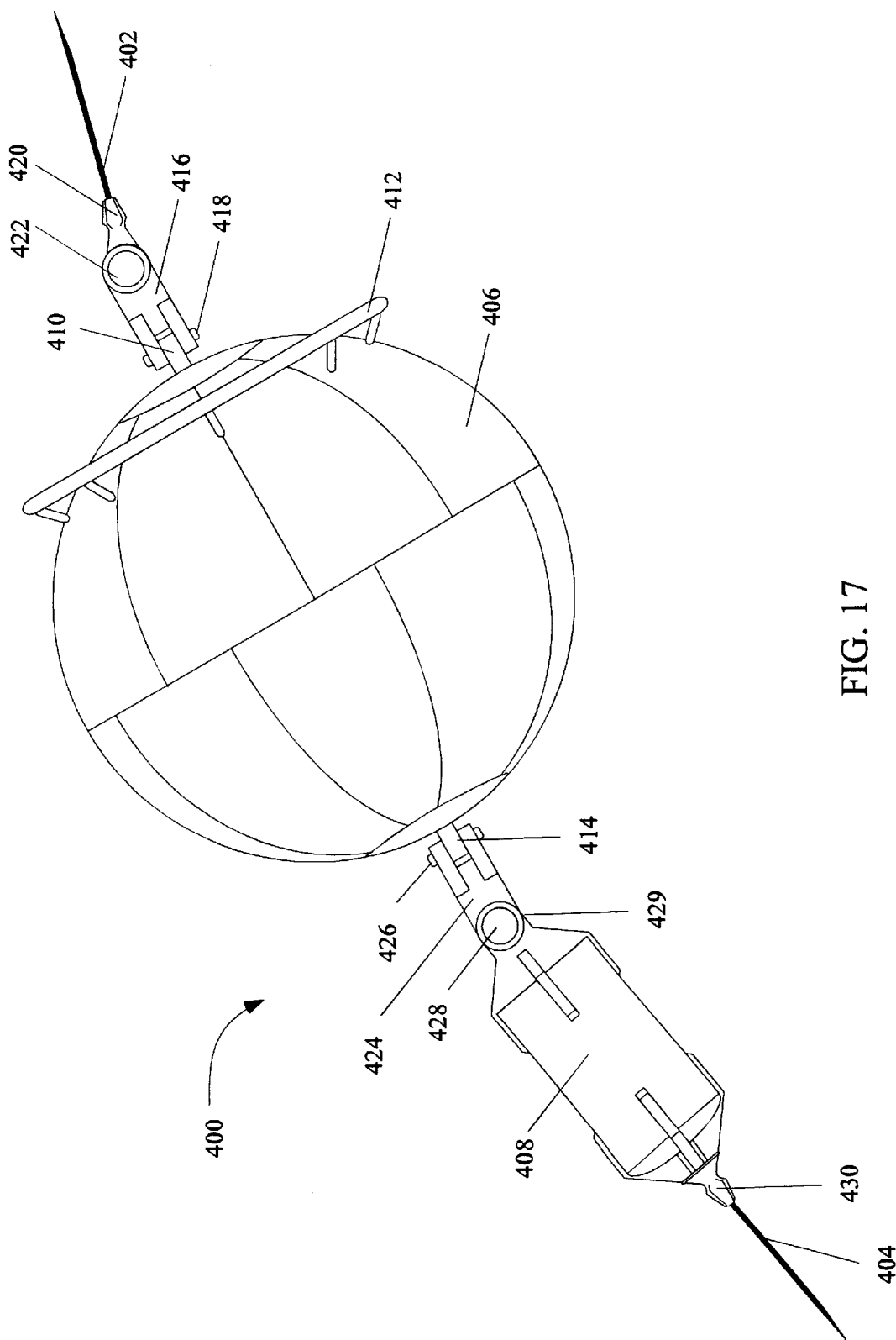
FIG. 17 shows another embodiment of a mooring line employing a tension limiting mooring piston.

Referring to FIG. 17, an alternate mooring system 400 which employs energy cells similar to energy cell 100 is shown. The mooring system 400 may be attached between a floating structure (not shown) and the seafloor or other body (not shown) to keep the floating structure on station. The mooring line 400 includes a first mooring line segment 402 and a second mooring line segment 404 which are linked by a buoy 406 and tension limiting device or mooring piston 408. The mooring piston 408 is similar to the mooring piston 306 shown in FIG. 15A. The buoy 406 is provided to support the mooring system 400 in water. The buoy 406 has an upper connector plate 410, a guardrail 412, and a lower connector plate 414. A dual joint connector 416 is pivotally attached to the upper connector plate 410 by a pin 418. The dual joint connector 416 is attached to a mooring line gripping arm 420 at the mooring line hinge joint 422. The hinge joint 422 allows rotation between the mooring line gripping arm 420 and the dual joint connector 416. In another embodiment, the mooring line gripping arm 422 may be replaced with a mooring piston similar to the mooring piston 408. The lower connector plate 414 is pivotally attached to a dual joint connector 424 by a pin 426. The dual joint connector 424 has a hinge joint 428 which mates with a hinge joint 429 on the mooring piston 408. The hinge joint 428 allows rotation between the dual joint connector 424 and the mooring piston 408. A mooring line gripping arm 430 attached to an end of the mooring piston 408 connects the second mooring line segment 404 to the mooring piston 408.

Figure 18:
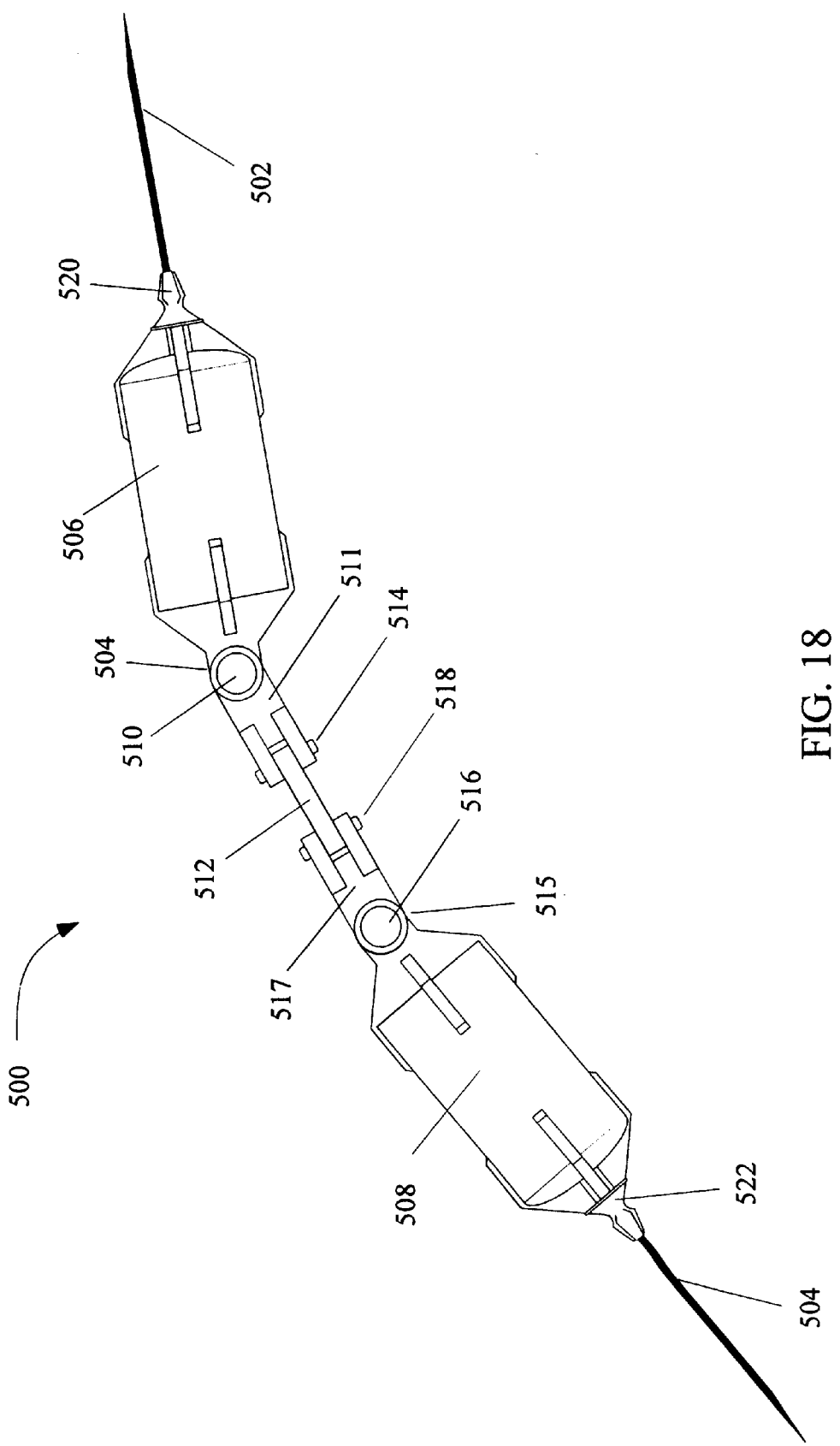
FIG. 18 shows another embodiment of a mooring line employing two tension limiting mooring pistons.

Referring to FIG. 18, an alternate mooring system 500 which employs energy cells similar to energy cell 100 is shown. The mooring system 500 may be attached between a floating structure (not shown) and the seafloor or other body (not shown) to keep the floating structure on station. The mooring line 500 includes a first mooring line segment 502 and a second mooring line segment 504 which are linked by tension limiting devices or mooring pistons 506 and 508. The mooring pistons 506 and 508 are similar to the mooring piston 306 shown in FIG. 15A. The mooring piston 506 has a hinge joint 509 which mates with a hinge joint 510 on a dual joint connector 511. The dual joint connector 511 is pivotally attached to a connector plate 512 by pins 514. The mooring piston 508 has a hinge joint 515 which mates with a hinge joint 516 on a dual joint connector 517. The dual joint connector 516 is pivotally attached to the connector plate 512 by pins 518. The mooring pistons 506 and 508 include mooring line gripping arms 520 and 522 for engaging the mooring line segments 502 and 504, respectively.

Figure 19A:
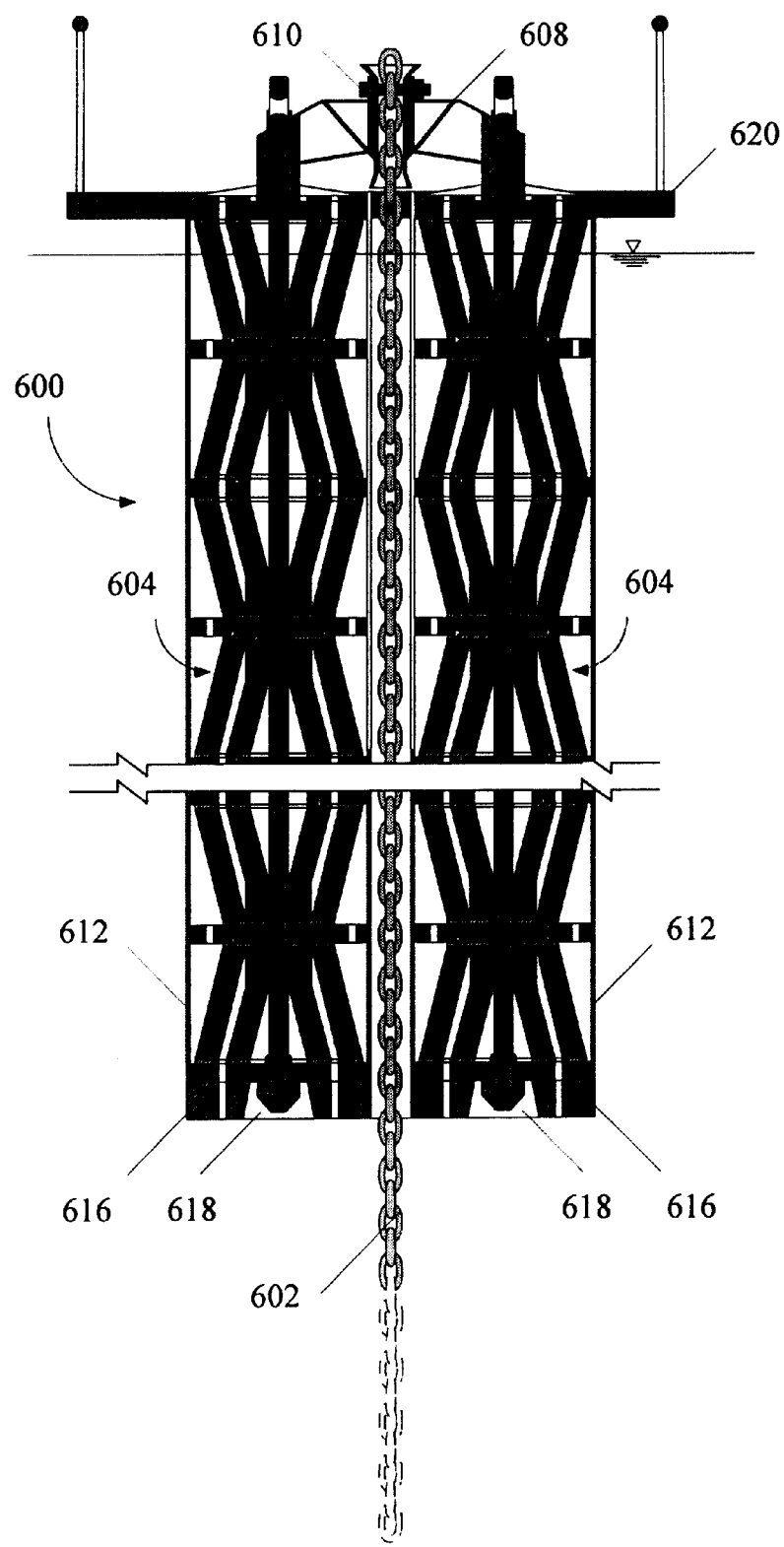
FIG. 19A shows a cross-sectional view of mooring system employing another a tension limiting piston having a dual set of tension limiting units in parallel configuration.
Figure 19B:
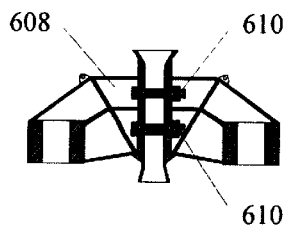
FIG. 19B is a cross-sectional view of a load spreader.
Figure 19C:
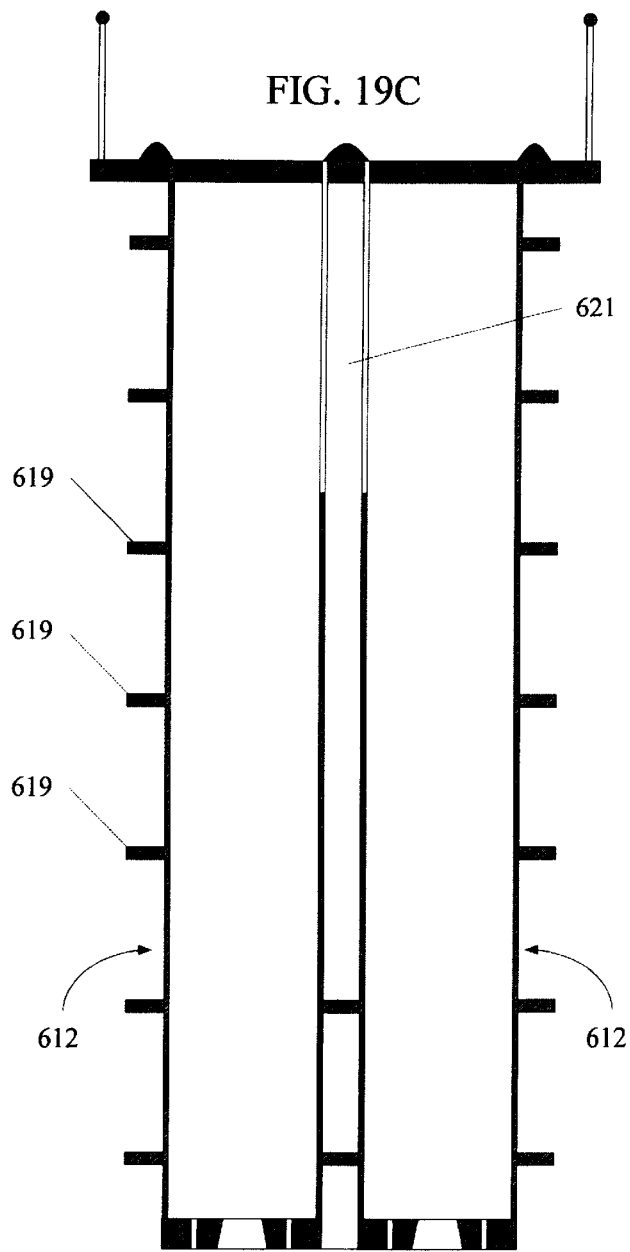
FIG. 19C is a cross-sectional view of a dual-set housing for the tension limiting units shown in FIG. 19A.

Referring to FIG. 19A, an alternate mooring system 600 which may be used to hold a floating structure (not shown) about a fixed mean position or station is shown. The mooring system 600 includes a segment of mooring line 602 arranged between a pair of tension limiting units 604 in a parallel configuration. The mooring line 602 is composed of chain and linked to the tension limiting units 604 by a load spreader 608. The mooring line 602 is connected to the load spreader 608 by a stopper pin 610. FIG. 19B shows the load spreader 608 having multiple stopper pins 610 that may be used to connect the mooring line 602 to the tension limiting units 604. The tension limiting units 604 are disposed within housings 612, each housing 612 having a support base 616 with a base aperture 618. FIG. 19C shows the housing 612 having multiple framing members 619 and an aperture 621 provided down through part of the housing to allow vertical movement of the load spreader 608. The entire mooring system 600 is attached to the hull of a floating structure (not shown). An access deck 620 is located above the waterline to provide access to the tension limiting units 604, the load spreader 608, and stopper pin 610 for connection, disconnection, installation, and repair procedures.

Figure 19D:
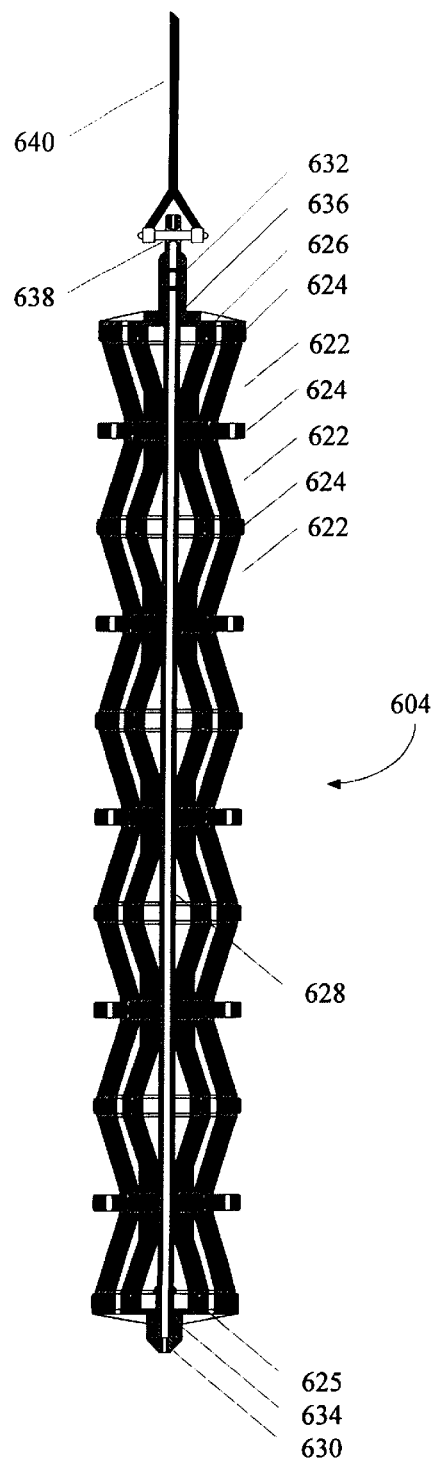
FIG. 19D is a detailed view of the tension limiting unit shown in FIG. 19A.

Referring to FIG. 19D, each tension limiting unit 604 is similar to the tension limiting unit 332 (shown in FIG. 15A) and includes elastomer springs 622 which are mounted between support discs 624 and end support discs 624 and 626. A shaft 628 extends through the elastomer springs 622. The shaft 628 has a bottom end cap 630 and a top end cap 632 fixed in place to hold the tension limiting unit under a predetermined pre-tension. Compression pads 634 and 636 are disposed on the shaft 628. A lifting eye 638 in the shaft 628 provides access for a lifting sling 640 to lift the tension limiting unit 604 during installation.

Figure 19E:
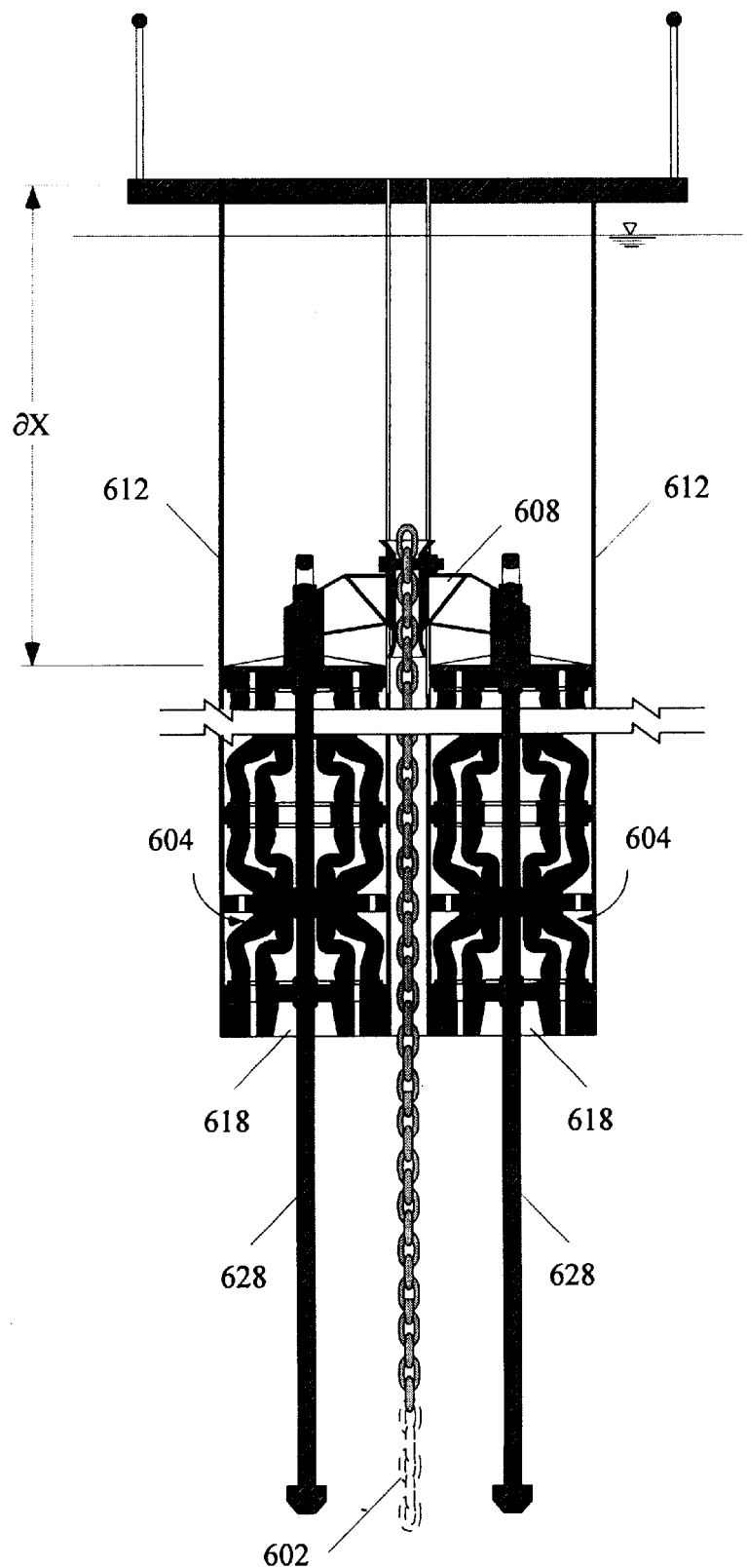
FIG. 19E is a cross-sectional view of the tension limiting mooring piston of FIG. 19A in compressed conditions.

In operation, the tension limiting units 604 are pre-tensioned to a predetermined level such that when the tensions in the mooring line 602 are below the mooring line pre-tension, the tension limiting units 604 function as rigid connections. However, as illustrated in FIG. 19E, upon exceeding the predetermined mooring line pre-tension, the tension limiting units 604 deflect an amount $\partial X$ to extend the mooring line 602 length and limit the peak tension in the mooring line 602. The shafts 628 of the tension limiting units 604 extend downward through the base apertures 618 in the housings 612. The shafts 628 are also coupled to the load spreader 608 and pull the load spreader 608 downwardly as they extend through the base apertures 618.

Figure 19F:
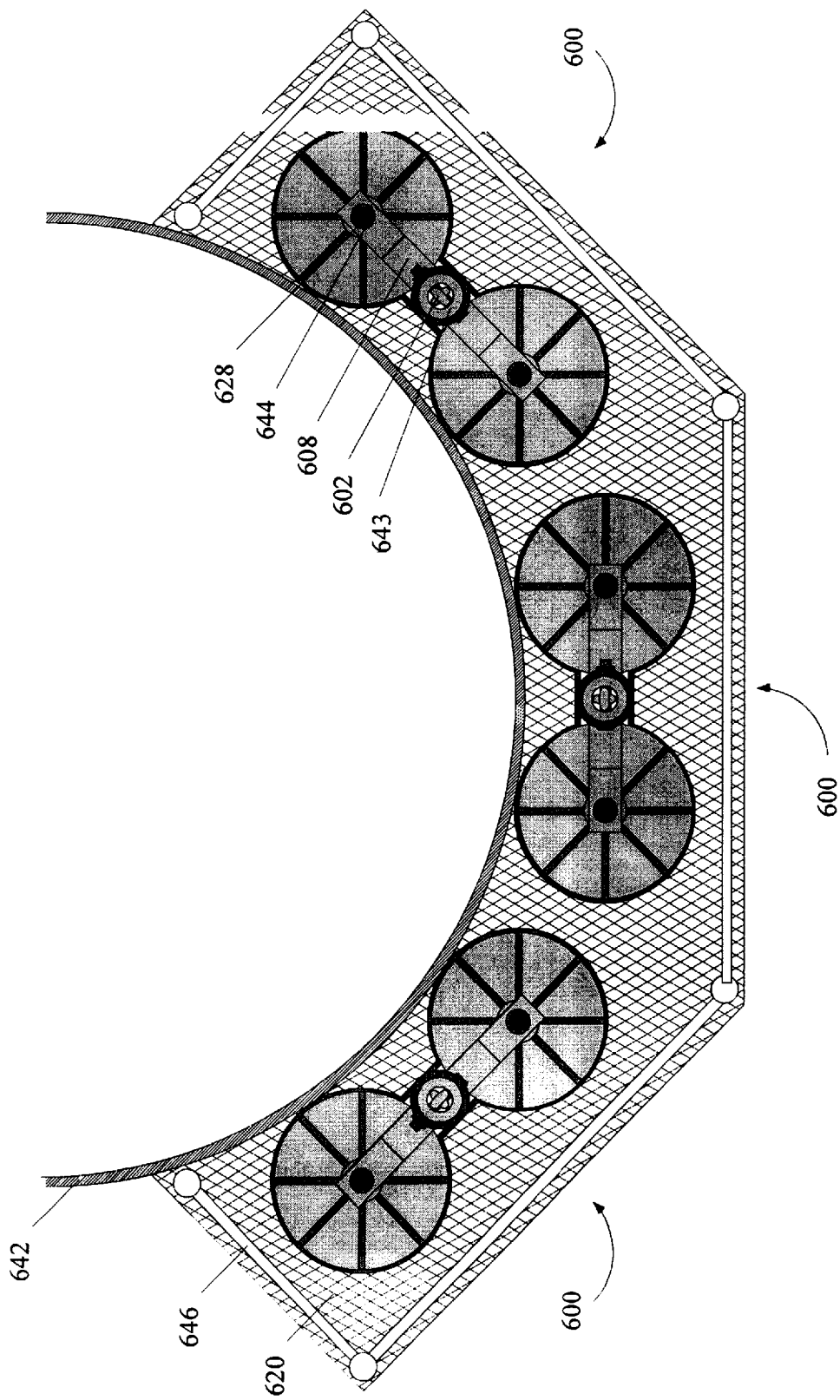
FIG. 19F is a top view of a three set configuration of the mooring system shown in FIG. 19A.

FIG. 19F shows a top view of a three set configuration of the mooring system 600 of FIG. 19A mounted on the column 642 of a floating structure. The mooring line 602 extends down through the aperture in the load spreader 608. The shafts 628 of the tension limiting units 604 are disposed within receptacles 644 on each side of the load spreader 608. As illustrated, the access deck 620 is enclosed by a guardrail 646. The three main components of the mooring system 600 are the mooring line 602, the load spreader 608, the housing 612, the tension limiting units 604. These components are all removable and interchangeable.

Figures 20A, 20B:
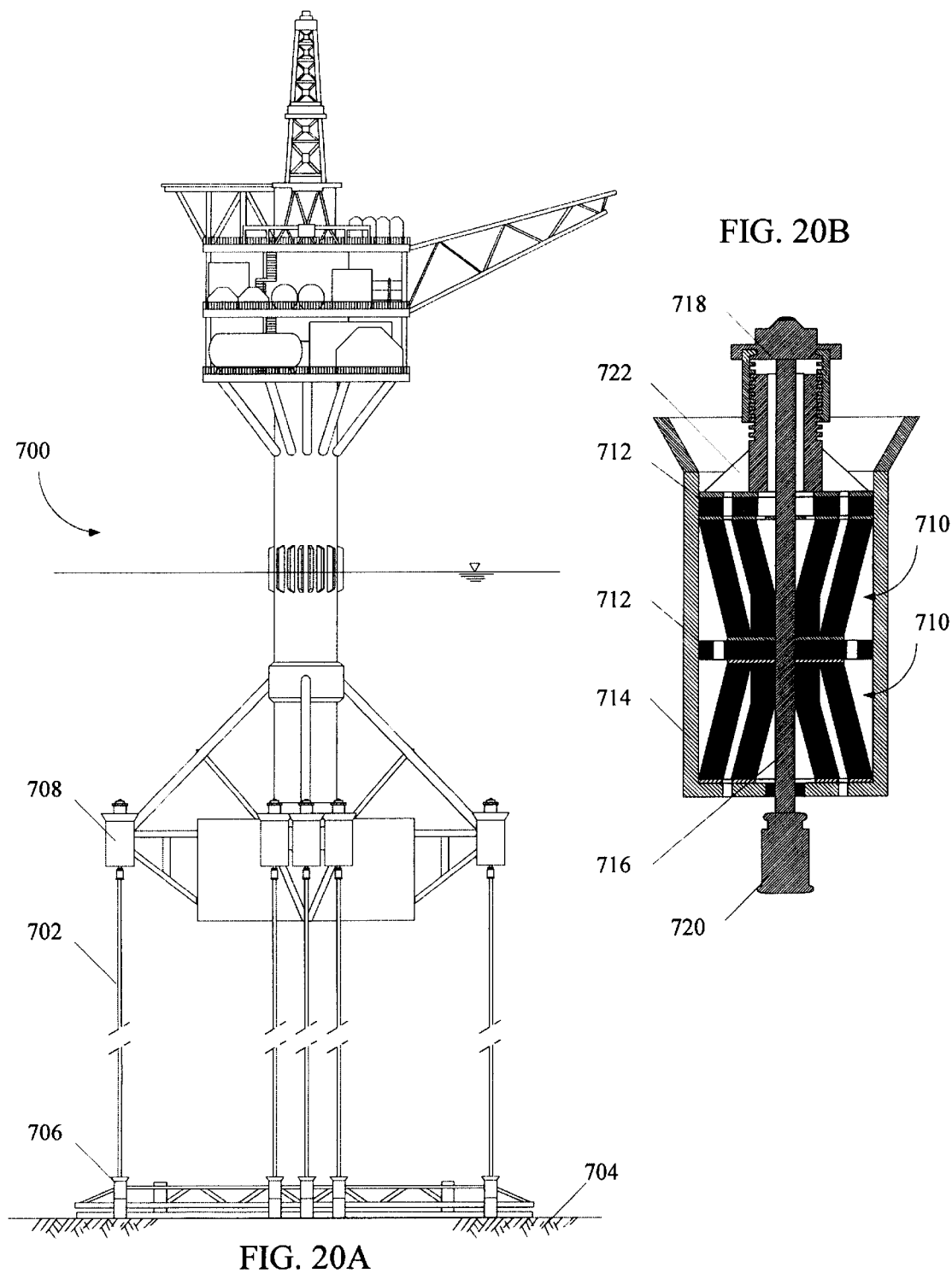
FIGS. 20A and 20B show an embodiment of a Mini-Tension Leg Platform employing a tendon with tension limiting mooring pistons.

The previously described systems generally dealt with applications to conventional mooring. The tension limiting device is readily adaptable for use with tendon systems. Referring to FIG. 20A, a system of tendons 702 having ends connected to the seafloor 704 and ends connected to a floating structure, e.g., Mini-Tension Leg platform 700, through tension limiting devices or tendon pistons 708 is shown. Referring to FIG. 20B, the tendon piston 708 comprises a series configuration of buckling elastomer springs 710 separated by support discs 712 and disposed within a housing 714. A shaft 716 extends between a compression adjustment mechanism 718 and a tendon coupling 720. The compression adjustment mechanism 718 applies compressive forces to the buckling elastomer springs through a load spreader 722. The compression adjustment mechanism 718 may be used to adjust the pre-tension in the tendons and to compensate for the creep behavior of the buckling elastomer springs 712. Alternatively, pre-tension may be applied to the tendons 702 and tendon pistons 708 and creep behavior of the buckling elastomer springs 712 can be compensated by deballasting the platform 700. The variations in tension between the individual tendons 702 may be equalized by fine adjustments of the compression adjustment mechanism 718. In the configuration shown, vertical stiffness of the platform 700 is principally controlled by the stiffness characteristics of the system of tendon pistons 708. In alternate embodiments, however, the tension limiting unit may comprise pre-tensioned buckling elastomer springs in order to serve as a rigid connection below the selected pretension. In this manner, the tendon stiffness rather than the tension limiting device stiffness controls for tendon pretensions below the selected pre-tension.

Figures 21A, 21B:
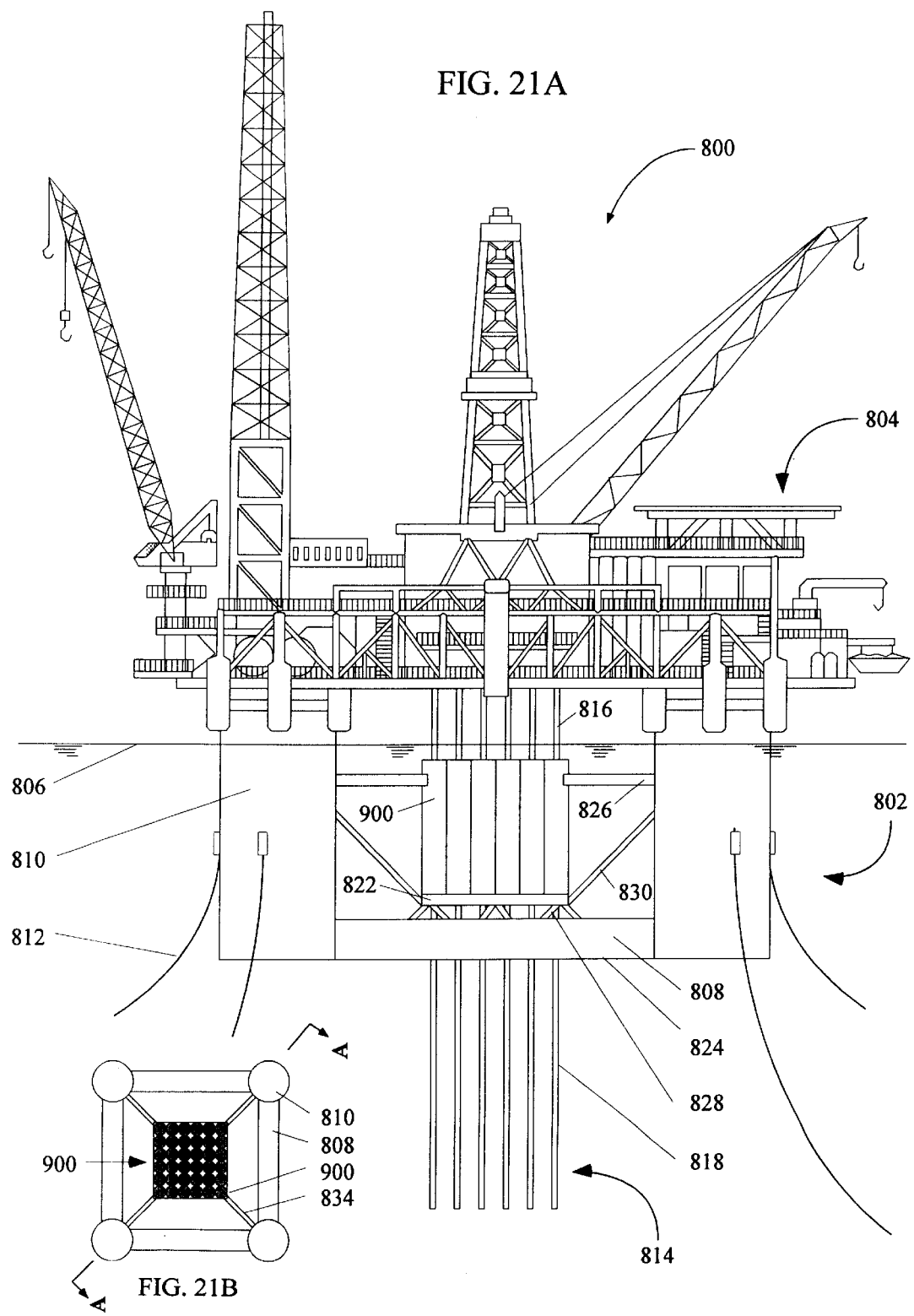
FIGS. 21A–21C illustrate an outboard profile and cross-sectional profile of a floating structure having an array of buckling elastomer riser tensioners in accordance with an embodiment of the invention.
Figure 21C:
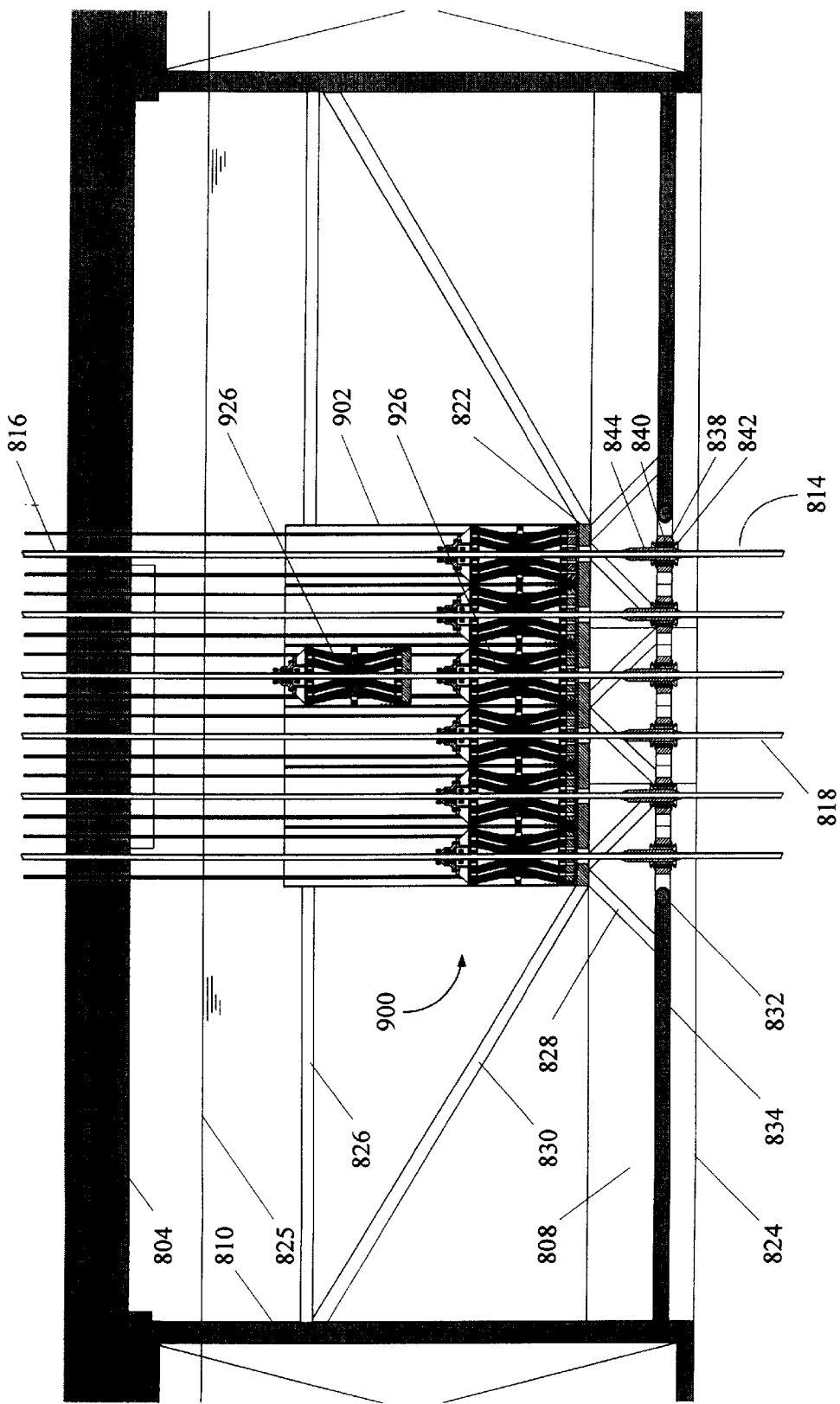

Referring now to FIGS. 21A–21C, a floating structure 800 includes a hull structure 802 which supports a deck 804 above a water surface 806. The hull structure 802 includes pontoons 808 and buoyant columns 810 supported on the pontoons 808. The floating structure 800 is held on station by a system of mooring lines 812. Risers 814 extend from the deck 804 to the seafloor (not shown). The risers 814 include upper riser sections 816 and lower riser sections 818. The upper riser sections 816 are linked to the lower riser sections 818 by buckling elastomer riser tensioners 900.

The buckling elastomer riser tensioning units 900 are supported on a base support 822 that is elevated above a keel 824. The buckling elastomer riser tensioning units 900 are submerged below the water line 825. The upper ends of the buckling elastomer riser tensioning units 900 are supported by a top bracing 826. The base support 822 is held in place by a base bracing 828 and a support bracing 830. The keel 824 includes a keel lattice 832 which is supported by a keel bracing 834. The keel bracing 834 extends in an X-pattern between the columns 810.

The keel 824 includes keel rings 838 and rubber donuts 840 disposed within the keel rings 838. Keel sleeves 842 are disposed within the rubber donuts 840. Each riser section 818 has a keel joint 844 that is disposed within the keel sleeve 842. The keel sleeve 842 allows vertical relative displacement of the keel joint 844. The rubber donut 840 around the keel sleeve 842 allows a limited range of angular deflection of the keel sleeve 842.

Figure 22:
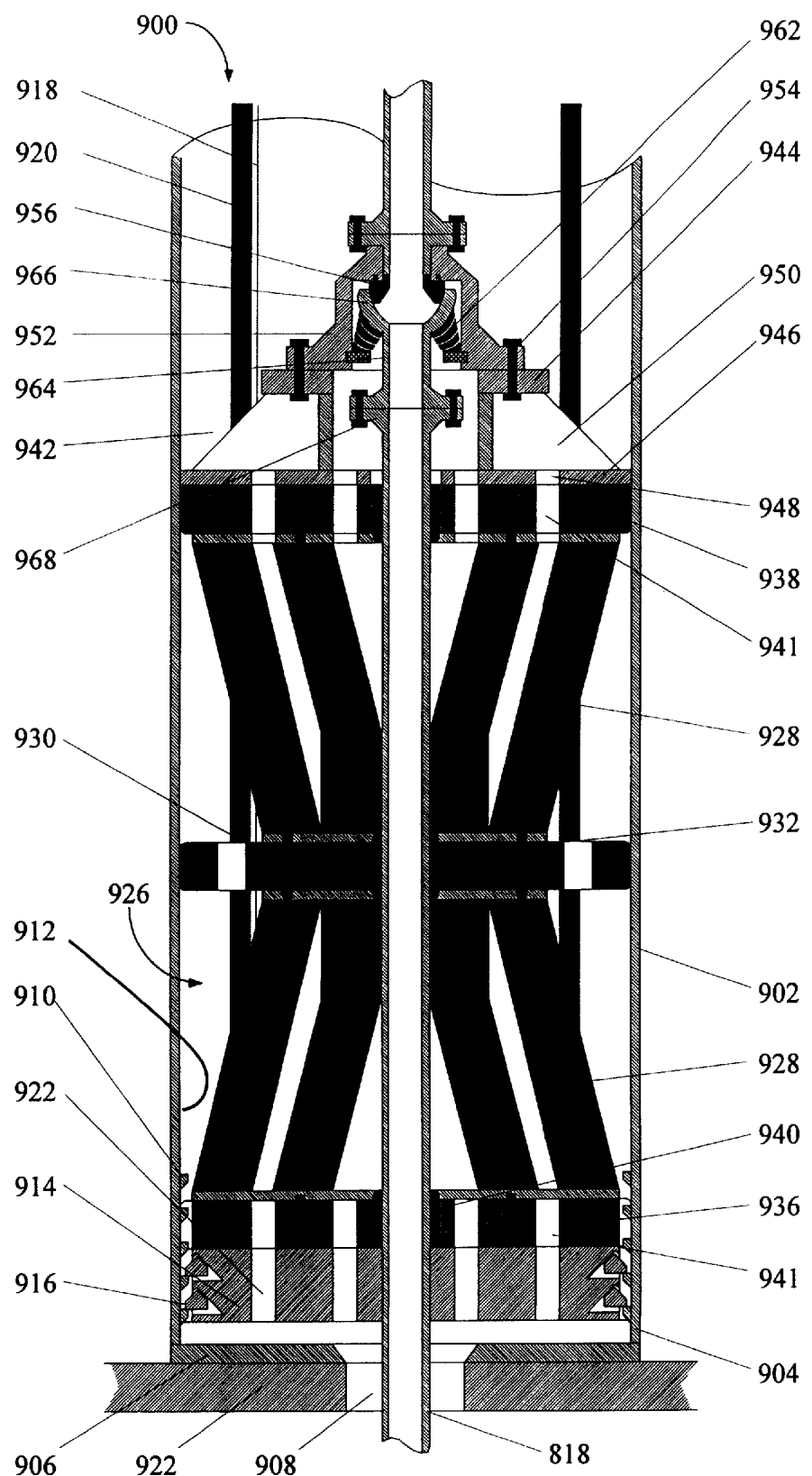
FIG. 22 is a cross-sectional side view of a lower portion of a buckling elastomer riser tensioner in accordance with an embodiment of the invention.

Referring to FIG. 22, each buckling elastomer riser tensioning unit 900 includes a housing 902 which has a bottom end 904 capped by an end plate 906. The end plate 906 is provided with an aperture 908. Vertical rows of annular gripper teeth 910 are located around an inner surface 912 of the housing 902. An internal gripper base 914 engages the annular gripper teeth 910 with a set of hydraulically retractable internal grippers 916. A hydraulic line 918 is run through the housing 902 to the internal gripper base 914. Pre-tension cables 920 are also run into housing 902. The internal gripper base 914 has perforations 922 through which seawater may flow into the housing 902.

A buckling elastomer riser tensioning unit 926 is disposed within the housing 902. The buckling elastomer riser tensioning unit 926 includes two energy cells 928 which have their tapered ends mounted on a support disc 930 by pins 932. The base ends of the energy cells 934 are mounted on support discs 936 and 938 by pins 932. The support discs 936 and 938 and the support disc 930 have central apertures which are aligned with the aperture 908 in the support disc 906 to provide a passageway for receiving the lower section 818 of the riser 814. Rubber donuts 940 are disposed in the central apertures to seal between the riser section 818 and the support discs 936 and 938 and support disc 930. The support discs 936 and 938 and support disc 930 have perforations 941 which allow passage of seawater to open spaces inside the housing 902 during deflection of the energy cells 928. The perforations 941 on the support disc 936 are aligned with the perforations 922 in the internal gripper base 914. The movement of seawater in the housing 902 during deflection of the energy cells adds viscous damping to the motion of the floating structure 800.

An end cap 942 is mounted on the end support disc 938. The end cap 942 comprises a top plate member 944 and a bottom plate member 946. The plate members 944 and 946 have perforations 948. The perforations 948 in the plate member 946 are aligned with the perforations 941 in the end support disc 938. Load spreaders 950 arranged in a radial pattern connect the plate members 944 and 946.

A housing 952 is mounted on the top plate member 944 by bolts 954. A wear bushing 956 is mounted inside the housing 952. A piston 964 disposed in the housing 952 has one end with a half-hemispherical flange 966 formed thereon and another end connected to the lower riser segment 818 with bolts 968. The half-hemispherical flange 966 engages an elastomer element 962 mounted inside the housing 952. The elastomer element 962 is arranged to allow a limited range of rotation of the lower riser segment 1618.

Referring back to FIG. 21C, the buckling elastomer riser tensioning units 900 may have more than one buckling elastomer riser tensioning unit 926 disposed within a single housing and attached to the riser 814 at more than one point. This would have the effect of placing multiple buckling elastomer riser tensioning units in parallel, with the multiplicative effects on the riser loading capacity. Such a configuration may be desirable to compensate for increased riser loads incident to such operations as riser work-over.

Referring to FIG. 23A, the riser 814 is shown in a non-tensioned state. In this non-tensioned state, the riser 814 is supported from above by a lifting mechanism (not shown) which is not associated with the buckling elastomer riser tensioner 900. An internal gripping mechanism (not shown) of the internal gripping base 914 retracts the gripper teeth 916 so that the internal gripping base 914 may be elevated through a distance ($\partial X_1$) by the pre-tensioning cable 920. The internal gripping base 914 is elevated until a desired pre-tension is achieved in the riser 814.

Referring to FIG. 23B, the internal gripping mechanism of the internal gripping base 914 releases the gripping teeth 916 when a desired pre-tension is achieved in the riser 814. This allows the gripper teeth 916 to engage the gripping teeth 910 on the inner surface of the housing 902. Then the lifting mechanism is operated to release the riser. This same compression adjustment procedure used in pre-tensioning the riser 914 may be employed to adjust for the creep behavior of the energy cells 928 over time.

In operation, motions of the floating structure 800 will induce relative displacements between the floating structure 800 and the riser 814. As the riser 814 is displaced, the energy cells 928 are deflected ($\partial X_2$). As shown in FIG. 23C, in a certain range of deflections, non-linear deformation of the energy cells will occur to place a limit on the maximum tension and magnitude of tension variations in the riser while providing a range of displacement of the floating structure ($\partial X_2$) under a roughly constant riser tension.

Figure 24A:
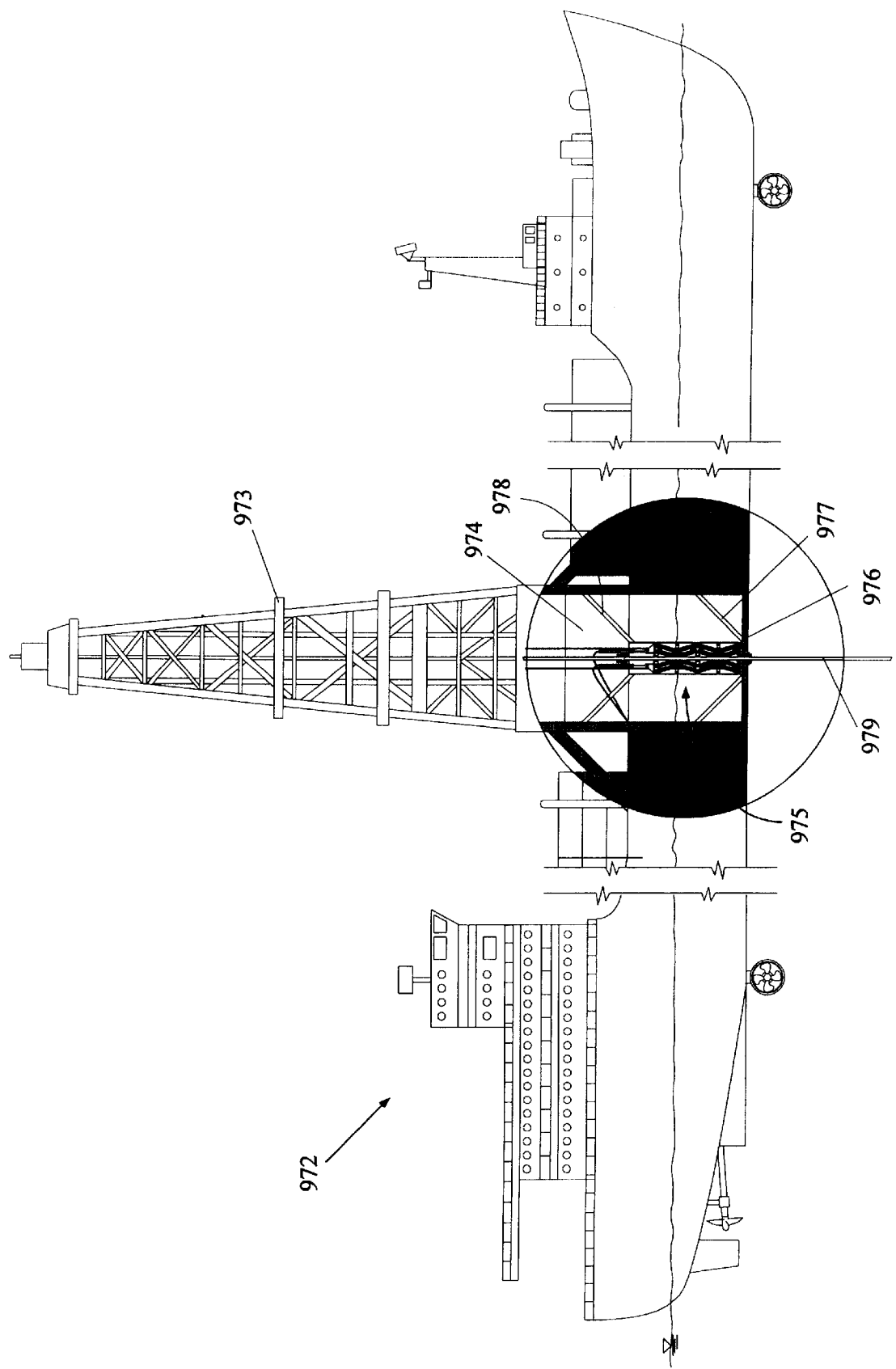
FIGS. 24A–24B illustrate a partial cross-sectional side view of a floating drilling structure employing a single buckling elastomer riser tensioner, and a cross-sectional side view of the buckling elastomer riser tensioner.
Figure 24B:
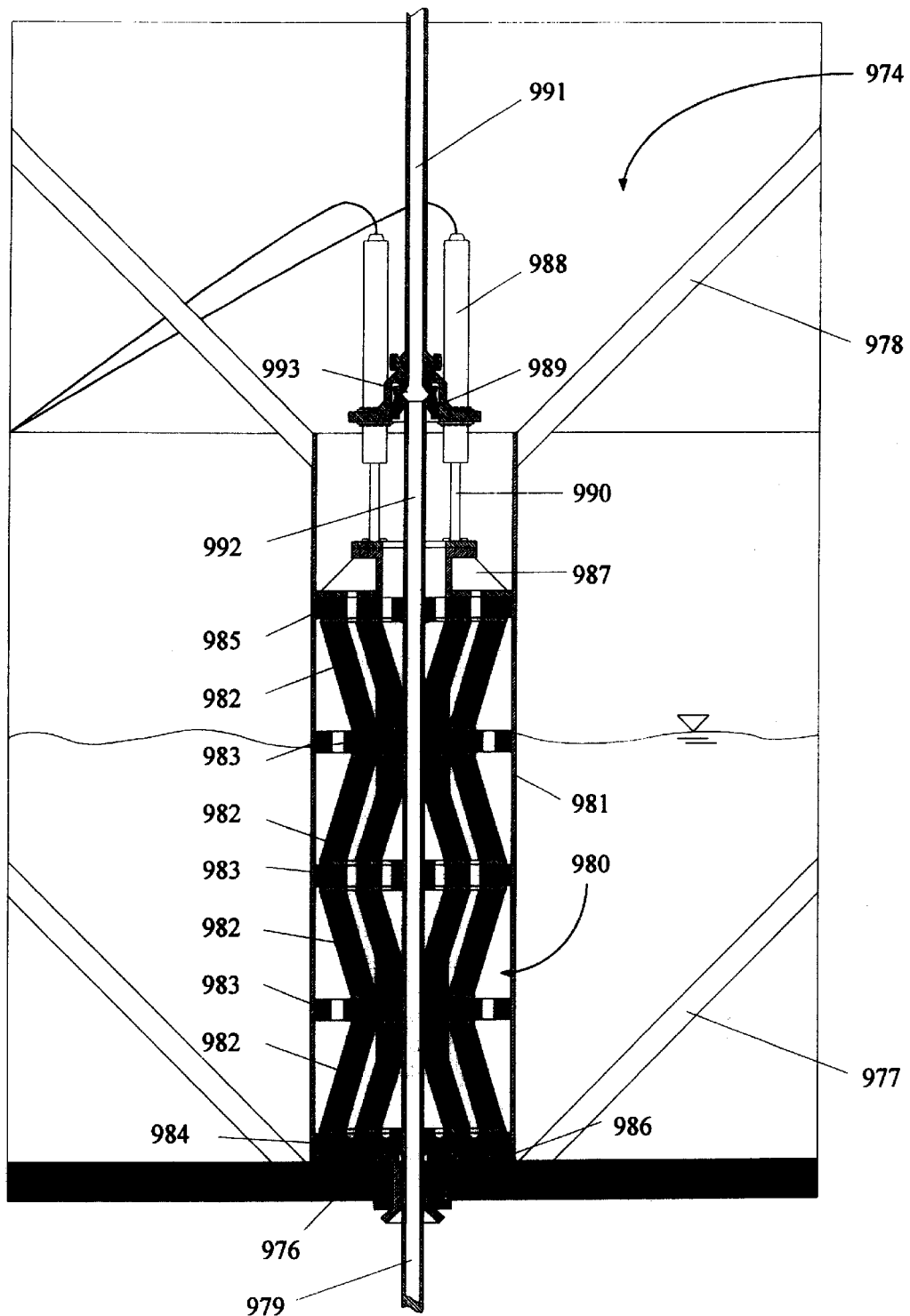

Referring to FIGS. 24A and 24B, a drill ship 972 having drill equipment 973 disposed above a moon pool 974 is shown. A buckling elastomer riser tensioner 975 is disposed within the moon pool 974 and is supported by a keel bracing 976, base bracing 977, and top bracing 978. The buckling elastomer riser tensioner 975 is attached to a drilling riser 979 in a pre-tension state. The buckling elastomer riser tensioner 975 includes a buckling elastomer riser tensioning unit 980 disposed within an annular housing 981. The buckling elastomer riser tensioning unit 980 comprises energy cells 982 pin-mounted between support discs 983 and end support discs 984 and 985. The end support discs 984 is positioned adjacent an end support disc 986 at the bottom end of the housing 981. The end plate 984 is supported on the keel bracing 976.

An end cap 987 is mounted on the buckling elastomer riser tensioning unit 980. Hydraulic units 988 can be used to adjust the compression of the energy cells 982 to pre-tension the riser 979. The hydraulic units 988 are connected to a flex joint 989 and have tensioning arms 990 which extend to depress the end cap 987, thereby compressing the energy cells 982. An upper section 991 of the riser 979 is bolted to the flex joint 989. A lower section 992 of the riser 979 includes a hemispherical flange 993 which is pivotally supported to the flex joint 989. The buckling riser tensioner 975 operates similarly to the buckling riser tensioning unit 900 shown in FIGS. 21A–21C.

It can be appreciated by reference to the foregoing description of various embodiments of the invention, that there are several advantages achieved by the present invention. First, when a system of tensile elements employing one or more energy cells, e.g., mooring system 300, are attached between a floating structure and the seafloor or other body, the maximum tensions in the tensile elements can be held substantially constant through a range of displacement of the floating structure. This allows for substantial fatigue reduction in the tensile elements, both by limiting the magnitude of tension variations experienced during a loading cycle and reducing the number of cycles encountered over a given design life by the percentage of time spent under roughly constant tension. The energy cells also limit the maximum tension in the tensile elements, resulting in a reduction in the design maximum tension requirement for a given configuration of tensile elements. These factors all combine to bring about a substantial reduction in the required cross-section for tensile elements and commensurate savings in mooring and tendon design.

Second, a system of tensile elements employing one or more energy cells have enhanced damping characteristics. The hysteresis characteristics of the buckling elastomer springs used in the energy cells themselves add damping to the system of tensile elements. Also, as in one embodiment, the use of the elastomer springs below the water line inserts relative motions along the length of the tensile elements so as to permit the addition of viscous damping apparatus to further increase the system damping characteristic. Both of these factors combine to improve the station-keeping performance for a given station-keeping system, particularly regarding resonant motion responses.

Third, when the energy cells operate in the presence of seawater, as illustrated in one embodiment of the invention, seawater provides a cooling medium to dissipate the energy absorbed by the hysteresis of the buckling elastomer springs during cyclic loading. This cooling mechanism allows a designer to maximize the hysteresis characteristic of the elastomer material to add additional damping to a system of tensile elements without compromising the structural integrity of the elastomer material.

Fourth, various embodiments of the present invention can provide extremely high tension loads, either by altering the size of the buckling elastomer spring used in the energy cell or by connecting the energy cells in parallel. This functionality permits riser tensioning to extreme water depths. The magnitude of the possible loading achieved by various embodiments of the present invention permit mooring lines and tendons to be highly pre-tensioned while still limiting the peak tensions encountered. Increased pre-tension improves the effectiveness of a station-keeping system to reduce mean lateral offsets. The magnitude of the possible loading achieved by the various embodiments of the invention, e.g., buckling riser tensioner 900, also permits full use of the tensile capacity of the riser, which may reduce or obviate the need for conventional sea-keeping devices, such as pre-tensioned tendons and mooring lines. This feature permits a paradigm shift in riser tensioning by allowing risers to function as sea-keeping tendons.

Fifth, by stacking energy cells in series, the various embodiments of the invention can provide virtually unlimited relative displacement between a tensile element, e.g., a riser, mooring line, or tendon, and a floating structure that can be maintained without altering the tension limiting characteristics. One embodiment permits the use of neutrally buoyant natural rubber, such that when employed below the water line the weight of the energy cells above will not press upon the weight of the lower energy cells to cause variations in performance. The invention is, therefore, capable of adaptation to vessels subject to relatively large heave motion.

Sixth, various embodiments of the invention may be utilized to manipulate the natural periods of motion of floating structure. One embodiment permits the tension limiting device to be the softest link in the station-keeping system, thereby permitting the stiffness characteristics of the tension limiting device, rather than the station-keeping system, to principally control the station-keeping system stiffness characteristics. Further, the present invention may be utilized to provide multiple condition natural periods dependent upon displacement of the floating structure or station-keeping system pretension. In the linear range of deflection, the tension limiting device provides a roughly linearly increasing tension force versus floating structure offset. However, when the tension load exceeds the buckling load for the tension limiting device, a second non-linear stiffness characteristic governs. This may be induced intentionally by increasing pre-tension to the station-keeping system or through incidental movement of the floating structure under wind and waves.

Seventh, the conventional complex active mechanical riser tensioner is replaced with a simple passive system of tensioning. This results in substantial savings in collateral equipment and energy required by these systems. Substantial savings in maintenance and monitoring costs are also realized. Further, the cost of the entire system is substantially reduced due to the simplicity of various embodiments of the invention and the relatively low cost of the classes of springs which may be utilized.

Eighth, the distinction between marine tendons and risers is made null. The tension in risers may be increased beyond the tension required to support the weight of the riser in tension, thereby acting to reduce heave motions of the vessel. The present system thereby allows the tendon function to be realized on almost any floating structure employing risers during operation, thus greatly expanding the availability of heave restraint devices on varying classes of floating structures and for lower budgets.

Ninth, in one embodiment of the invention, the tensioning system is removed from the deck and placed at the keel of the vessel, submerged in water. This can result in a large stability increase by lowering the center of gravity for the vessel by applying riser weight at a lower point on the floating structure. Increased stability generally results in substantially improved global motions characteristics for the floating structure. This is especially true for vessels such as drill ships and SPAR platforms that are subject to relatively large pitching motions. The increased stability realized may further act to make practicable advantageous floating structures which had been previously unworkable due to stability concerns.

While the invention has been described with respect to limited number of embodiments, it should be understood that the invention is not intended to be limited to the particular embodiments disclosed. Rather, the invention is to cover all modifications, equivalents, and alternatives falling within the spirit and scope of the invention as set forth by the appended claims.

What is claimed is:

1. A tensile system for attachment between a first body and a second body having relative movement with respect to each other, comprising:

at least one tensile element attached to the first body; and at least one first collapsible energy cell coupled between the tensile element and the second body, the first collapsible energy cell comprising a first buckling elastomer spring, the first collapsible energy cell having a normal state wherein the first buckling elastomer spring is unbuckled and a collapsed state wherein the first buckling elastomer spring buckles through a range of deflections the first collapsible energy cell further comprising a buckling restraint member which engages the first buckling elastomer spring in the collapsed state so as to augment the load bearing capacity of the first buckling elastomer spring through the range of deflections;

wherein the first buckling elastomer spring buckles when a compressive force induced in the first buckling elastomer spring by the relative movement between the first body and the second body exceeds a critical force.

2. The tensile system of claim 1, further comprising one or more collapsible energy cells linked in series to the first collapsible energy cell.

3. The tensile system of claim 1, wherein the buckling restraint member includes a second buckling elastomer spring coupled to the first buckling elastomer spring so as to deflect with the first buckling elastomer spring as a single unit, the second buckling elastomer spring being arranged to provide additional buckling load capacity to a buckling load capacity of the first buckling elastomer spring.

4. The tensile system of claim 1, further comprising a compression adjustment means for providing adjustment of the extent of compression of the first buckling elastomer spring.

5. The tensile system of claim 1, wherein the buckling restraint member includes a second buckling elastomer spring arranged adjacent the first buckling elastomer spring in such a manner as to contact and limit the extent of lateral displacement of the first buckling elastomer spring as the first buckling elastomer spring buckles.

6. The tensile system of claim 1, wherein the buckling restraint member includes a generally cylindrical member encompassing the first buckling elastomer spring.

7. The tensile system of claim 1, wherein the first buckling elastomer spring has a selected pre-tension which enables the first buckling elastomer spring to function as a rigid joint between the tensile element and the second body when the tension in the tensile element is below the selected pre-tension.

8. The tensile system of claim 1, wherein the first buckling elastomer has a selected pre-compression so that no further compression of the first buckling elastomer spring occurs until the tension in the tensile element exceeds a reaction force of the first elastomer spring corresponding to the selected pre-compression.

9. The tensile system of claim 1, wherein the tensile element has a selected pre-tension which applies a compressive force to deflect the first buckling elastomer spring to an extent below that required to buckle the first buckling elastomer spring.

10. The tensile system of claim 1, further comprising:

a housing located around the first buckling elastomer spring in a direction parallel to an axis of compression of the buckling elastomer spring; and at least one support member disposed within the housing and engaging an end of the buckling elastomer spring;

wherein the support member permits translation of the first buckling elastomer spring along the axis of compression.

11. The tensile system of claim 10, wherein the support member engages the first buckling elastomer spring in such a manner as to restrict rotation of the first buckling elastomer spring about the axis of compression.

12. The tensile system of claim 1, further comprising a second collapsible energy cell coupled between the tensile element and the second body and arranged in a parallel configuration with the first collapsible energy cell such that the tension in the tensile element is divided between the first and second collapsible energy cells.

13. The tensile system of claim 1, further comprising a compression adjustment means for providing adjustment of the extent of compression of the first buckling elastomer spring in relation to a fixed relative distance between the tensile element and the second body.

14. A tensile system for attachment between a floating structure having relative movement with respect to a stationary body, comprising:

at least one tensile element attached to the stationary body; and at least one first collapsible energy cell coupled between the tensile element and the floating structure, the first collapsible energy cell comprising a first buckling elastomer spring, the first collapsible energy cell having a normal state wherein the first buckling elastomer spring is unbuckled and a collapsed state wherein the first buckling elastomer spring buckles through a range of deflections, the first collapsible energy cell further comprising a buckling restraint member which engages the first buckling elastomer spring in the collapsed state so as to augment the load bearing capacity of the first buckling elastomer spring through the range of deflections;

wherein the first buckling elastomer spring buckles when a compressive force induced in the first buckling elastomer spring by the relative movement between the floating structure and the stationary body exceeds a critical force.

15. The tensile system of claim 14, wherein at least a portion of the first buckling elastomer spring is located below a mean waterline of the floating structure.

16. The tensile system of claim 15, further comprising a damping device responsive to relative displacements of the first buckling elastomer spring, the damping device being configured to provide damping to the motions of the floating structure.

17. The tensile system of claim 15, further comprising a housing having at least one port and wherein the first collapsible energy cell is disposed within the housing, the port being configured to impede fluid flow in and out of the housing during deflection of the first buckling elastomer spring, the movement of water in the housing providing viscous damping to the motion of the floating structure.

18. The tensile system of claim 17, further comprising:
a second collapsible energy cell disposed in the housing, the second collapsible energy cell comprising a second buckling elastomer spring; and
a support plate disposed between the first and second collapsible energy cells, the support plate being arranged to impede the movement of water within the housing during deflection of the first and second buckling elastomer springs.

19. The tensile system of claim 14, wherein the tensile element is a mooring line.

20. The tensile system of claim 14, wherein the tensile element is a marine tendon.

21. The tensile system of claim 14, wherein the tensile element is a guy wire.

22. The tensile system of claim 14, wherein the tensile element is a tow cable.

23. A method of limiting tension in a tensile element attached between a first body and a second body, comprising:
selecting a maximum tension and a range of tension variations for the tensile element;
predicting a range of displacements between the first body and the second body;
selecting at least one collapsible energy cell having at least one buckling elastomer spring configured to buckle and deflect non-linearly through the predicted range of displacements and a buckling restraint member which engages the buckling elastomer spring so as to augment the load bearing capacity of the buckling elastomer spring as the buckling elastomer spring buckles;
attaching the tensile element to the first body; and
coupling the tensile element to the second body through the collapsible energy cell such that relative displacements between the first body and the second body induce buckling of the buckling elastomer spring.

24. The tensile system of claim 23, further comprising pre-tensioning the buckling elastomer spring so as to initially deflect the buckling elastomer spring to an extent less than that required to induce buckling.

25. The method of claim 23, wherein the second body is a floating structure and coupling the tensile element to the second body further comprises placing at least a portion of the buckling elastomer spring below the mean waterline of the second body.

26. The method of claim 25, wherein selecting at least one collapsible energy cell further comprises placing the collapsible energy cell in a housing having at least one flow path for impeding movement of fluid inside the housing during deflection of the buckling elastomer spring.

27. A tensile system for attachment between a floating body and a stationary body, comprising:
at least one riser extending between the floating body and the stationary body, the riser having an end coupled to the stationary body;
a support base coupled to the floating body, the support base bracing the riser; and
a first riser tensioner having a first end coupled to the riser and a second end coupled to the support base, the riser tensioner comprising a plurality of collapsible energy cells stacked in series, each collapsible energy cell comprising a first elastomer spring and having a normal state wherein the first buckling elastomer spring is unbuckled and a collapsed state wherein the first buckling elastomer spring buckles through a range of deflections, each collapsible energy cell further comprising a buckling restraint member which engages the first buckling elastomer spring so as to augment the load bearing capacity of the first buckling elastomer spring through the range of deflections;
wherein movement of the support base relative to the riser induces a compressive force to deflect the first buckling elastomer springs, the first buckling elastomer springs maintaining a tension in the riser substantially constant through the range of deflections.

28. The tensile system of claim 27, further comprising:
a compression adjustment means for providing adjustment of the extent of compression of each first buckling elastomer spring in relation to a fixed relative distance between the riser and the support base.

29. The tensile system of claim 28, wherein the compression adjustment means is disposed between the first end of the riser tensioner and the riser for adjustment of the relative distance between the first end of the riser tensioner and the riser.

30. The tensile system of claim 28, wherein the compression adjustment means is disposed between the second end of the riser tensioner and the support base for adjustment of the relative distance between the second end of the riser tensioner and the support base.

31. The tensile system of claim 28, wherein the compression adjustment means further comprises a reaction force measurement device so as to allow reading of tension in the riser during compression adjustment.

32. The tensile system of claim 27, further comprising:
a housing located around the first buckling elastomer springs in a direction parallel to an axis of compression of the first buckling elastomer springs; and
at least one support member disposed within the housing and engaging an end of the first buckling elastomer spring;
wherein the support member permits translation of the first buckling elastomer spring along the axis of compression.

33. The tensile system of claim 32, wherein the support member engages the first buckling elastomer spring in such a manner as to restrict rotations of the first buckling elastomer springs about the axis of compression.

34. The tensile system of claim 27, further comprising a second riser tensioner engaging the riser in a parallel configuration with the first riser tensioner.

35. The tensile system of claim 34, wherein the parallel configuration comprises a first connection and a second connection point along the riser and wherein the first riser tensioner engages the riser at the first connection point and the second riser tensioner engages the riser at the second connection point.

36. The tensile system of claim 34, wherein the parallel configuration comprises a single connection point along the length of the riser and both first and second riser tensioners engage the riser at the single connection point.

37. The tensile system of claim 27, further comprising a second buckling elastomer spring coupled with each first buckling elastomer spring so as to deflect with the first buckling elastomer spring as a single unit, each second buckling elastomer spring being arranged to provide additional buckling load capacity to a buckling load capacity of each corresponding first buckling elastomer spring.

38. The tensile system of claim 37, further comprising a second buckling elastomer spring arranged to engage each first buckling elastomer spring as the first buckling elastomer spring buckles, each second buckling elastomer spring providing additional reaction force to a reaction force of the corresponding first buckling elastomer spring during a portion of deformation of the first buckling elastomer spring.

39. The tensile system of claim 27, further comprising a lateral restraining member for limiting the extents of lateral displacement of the first buckling elastomer springs as the first buckling elastomer springs buckle.

40. The tensile system of claim 39, wherein the lateral restraining member is a generally cylindrical member encompassing the first buckling elastomer springs.

41. The tensile system of claim 27, wherein the support base is located so as to apply the tension load of the riser to the floating body at a location below a mean waterline for the floating body.

42. The tensile system of claim 41, wherein the riser tensioner further comprises a housing and wherein the collapsible energy cells are disposed within the housing and the housing is disposed below the waterline.

43. The tensile system of claim 42, wherein the housing comprises at least one port and wherein the port is configured to impede fluid flow in and out of the housing during deflection of the first buckling elastomer springs, the movement of water in the housing providing viscous damping to the motion of the floating structure.

44. The tensile system of claim 42, further comprising one or more support plates disposed between the first buckling elastomer springs, the support plate being arranged to impede the movement of water within the housing during deflection of the first buckling elastomer springs.

45. A tensile system for attachment between a floating body and a stationary body, comprising:

at least one riser extending between the floating body and the stationary body, the riser having an end coupled to the stationary body;

a support base coupled to the floating body, the support base bracing the riser; and a first riser tensioner having a first end coupled to the riser and a second end coupled to the support base, the riser tensioner comprising a plurality of collapsible energy cells stacked in series, the collapsible energy cells comprising buckling elastomer springs configured to buckle through a range of deflections in response to movement of the support base relative to the riser and buckling restraint members engaging the buckling elastomer springs so as to produce a non-decreasing reaction force through the range of deflections;

wherein movement of the support base relative to the riser induces a compressive force on the buckling elastomer springs which induces buckling of the elastomer springs.

* * * * *